(12) United States Patent
Kim

(10) Patent No.: US 12,063,547 B2
(45) Date of Patent: Aug. 13, 2024

(54) METHOD AND APPARATUS FOR MUTUAL COEXISTENCE COMMUNICATION IN WIRELESS LAN

(71) Applicants: Hyundai Motor Company, Seoul (KR); Kia Corporation, Seoul (KR); Korea National University of Transportation Industry-Academic Cooperation Foundation, Chungju-Si (KR)

(72) Inventor: Yong Ho Kim, Incheon (KR)

(73) Assignees: Hyundai Motor Company, Seoul (KR); Kia Corporation, Seoul (KR); Korea National University of Transportation Industry-Academic Cooperation Foundation, Chungcheongbuk-do (KR)

(*) Notice: Subject to any disclaimer, the term of this patent is extended or adjusted under 35 U.S.C. 154(b) by 453 days.

(21) Appl. No.: 17/428,570

(22) PCT Filed: Feb. 7, 2020

(86) PCT No.: PCT/KR2020/001789
§ 371 (c)(1),
(2) Date: Aug. 4, 2021

(87) PCT Pub. No.: WO2020/162721
PCT Pub. Date: Aug. 13, 2020

(65) Prior Publication Data
US 2022/0110020 A1    Apr. 7, 2022

(30) Foreign Application Priority Data

Feb. 7, 2019   (KR) .................. 10-2019-0014221
Mar. 7, 2019   (KR) .................. 10-2019-0026366
May 13, 2019   (KR) .................. 10-2019-0055721

(51) Int. Cl.
*H04W 28/06*        (2009.01)
*H04L 69/28*        (2022.01)
(Continued)

(52) U.S. Cl.
CPC .............. *H04W 28/06* (2013.01); *H04L 69/28* (2013.01); *H04W 4/40* (2018.02); *H04W 74/085* (2013.01)

(58) Field of Classification Search
CPC ..... H04W 28/06; H04W 4/40; H04W 74/085; H04L 69/28
See application file for complete search history.

(56) References Cited

U.S. PATENT DOCUMENTS

2009/0262718 A1   10/2009   Meier et al.
2010/0260159 A1   10/2010   Zhang et al.
(Continued)

FOREIGN PATENT DOCUMENTS

| KR | 2012-0023610 A | 3/2012 |
| KR | 2016-0138979 A | 12/2016 |
| KR | 2017-0138427 A | 12/2017 |

*Primary Examiner* — Ronald B Abelson
(74) *Attorney, Agent, or Firm* — Fox Rothschild LLP

(57) ABSTRACT

A method for operating a first communication node in a wireless communication network includes steps of: receiving a first frame according to a first communication protocol from a second communication node; determining whether hop count information is included in the first frame; when the hop count information is not included in the first frame, generating and transmitting a second frame according to the first communication protocol, the second frame including hop count information set to an initial value; and setting an operating state of the first communication node to a first state in which the first communication node operates according to the first communication protocol.

19 Claims, 20 Drawing Sheets

(51) Int. Cl.
  *H04W 4/40* (2018.01)
  *H04W 74/0833* (2024.01)

(56) References Cited

U.S. PATENT DOCUMENTS

| | | |
|---|---|---|
| 2016/0309404 A1 | 10/2016 | Kasslin et al. |
| 2017/0034769 A1 | 2/2017 | Kim et al. |
| 2018/0159801 A1* | 6/2018 | Rajan ...................... H04L 45/66 |
| 2018/0288759 A1 | 10/2018 | Eitan et al. |

* cited by examiner

METHOD AND APPARATUS FOR MUTUAL COEXISTENCE COMMUNICATION IN WIRELESS LAN

CROSS-REFERENCE TO RELATED APPLICATIONS

This application is a National Phase application filed under 35 USC 371 of PCT International Application No. PCT/KR2020/001789 with an International Filing Date of Feb. 7, 2020, which claims the benefit of Korean Patent Application No. 10-2019-0055721 filed on May 13, 2019; Korean Patent Application No. 10-2019-0026366 filed on Mar. 7, 2019 and Korean Patent Application No. 10-2019-0014221 filed on Feb. 7, 2019. The entire contents of these applications are incorporated herein by reference in their entirety.

BACKGROUND

(a) Technical Field

The present disclosure relates to a wireless local area network (LAN) communication method, more particularly, to a communication method in which new wireless LAN communication nodes can coexist with legacy wireless LAN communication nodes, an apparatus for the same, and a system for the same.

(b) Description of the Related Art

Recently, with the spread of mobile devices, wireless local area network (wireless LAN) technology, which provides fast wireless Internet service, has been in the spotlight. The WLAN technology enables mobile devices such as smart phones, smart pads, laptop computers, portable multimedia players, embedded devices, and the like to wirelessly connect to the Internet based on wireless communication technology at a short range.

Early WLAN technology used a frequency band of about 2.4 GHz in accordance with an Institute of Electrical and Electronics Engineers (IEEE) 802.11 standard to support a data transmission rate of about 1 Mbps to about 2 Mbps based on frequency hopping, spread spectrum, infrared communication, and the like. Recently, an orthogonal frequency division multiplex (OFDM) scheme was applied to support a data transmission rate of up to about 54 Mbps. In addition, the IEEE 802.11 is realizing or developing standards for various technologies such as Quality of Service (QoS) enhancement, access point (AP) protocol compatibility, security enhancement, radio resource measurement, wireless access vehicular environment (WAVE), fast roaming, mesh network, interworking with external networks, and wireless network management.

Among the various IEEE 802.11 standards, the IEEE 802.11b supports a data transmission rate of up to about 11 Mbps using the 2.4 GHz frequency band. The IEEE 802.11a, commercialized after the IEEE 802.11b, reduced impact of interferences compared to the congested 2.4 GHz frequency band by using a frequency band of about 5 GHz instead of the 2.4 GHz frequency band, and improved the data transmission rate to the maximum of about 54 Mbps using the OFDM technology. However, the IEEE 802.11a has a shorter communication range than the IEEE 802.11b. Additionally, the IEEE 802.11g, like the IEEE 802.11b, uses the 2.4 GHz frequency band to realize a data transmission rate of up to about 54 Mbps. Backward compatibility of the IEEE802.11g has received considerable attention, and a communication range of the IEEE802.11g is superior to the IEEE 802.11a.

In addition, the IEEE 802.11n is a technical standard established to overcome the limitation on the data transmission rate. The limitation on the data transmission rate is considered a weak point of the WLAN. The IEEE 802.11n increases speed and network reliability and extends the operating range of wireless networks. More specifically, the IEEE 802.11n supports high throughput (HT) with a data transmission rate of up to about 540 Mbps and is based on Multiple Inputs and Multiple Outputs (MIMO) technology. The MIMO uses multiple antennas at both a transmitter side and a receiver side to minimize transmission errors and optimize data rates. Additionally, the IEEE 802.11n uses a coding scheme of transmitting multiple duplicate copies to increase data reliability, and may also use the OFDM to increase a transmission speed.

As the use of WLAN spreads and WLAN applications are diversified, WLAN systems have been developed to support relatively high throughput (VHT) compared to the data throughput supported by the IEEE 802.11n. Among them, the IEEE 802.11ac supports a wide bandwidth (about 80 MHz to about 160 MHz) at a frequency band of about 5 GHz. The IEEE 802.11ac standard is defined only in the 5 GHz frequency band, but for backward compatibility with products supporting the existing 2.4 GHz frequency band, early IEEE 802.11ac chipsets also support operations in the 2.4 GHz frequency band. Particularly, the IEEE 802.11ac supports a bandwidth of up to about 40 MHz at the 2.4 GHz frequency band. Theoretically, based on the IEEE 802.11ac standard, a WLAN speed of multiple terminals may be at least about 1 Gbps, and a maximum single link speed may be at least about 500 Mbps. The WLAN speed and the maximum single link speed are accomplished by extending wireless interfaces adopted by the IEEE 802.11n, such as wider radio frequency bandwidth (up to about 160 MHz), more MIMO spatial streams (up to eight), multi-user MIMO, and higher density modulation (up to about 256 quadrature amplitude modulation (QAM)). In addition, the IEEE 802.11ad is a scheme of transmitting data using a frequency band of about 60 GHz instead of the existing 2.5 GHz and 5 GHz bands. IEEE 802.11ad is a transmission standard that provides a data transmission rate up to about 7 Gbps using beamforming technology, and the 802.11ad is suitable for a large amount of data or high bitrate video streaming such as uncompressed HD video. However, signals transmitted in the 60 GHz frequency band have difficulty in passing through obstacles, and thus may be used only between devices in a short range.

The WLAN may use a wide frequency band. To use the wide frequency band, a station checks whether there is an available band for a certain period of time before transmitting data, and uses the wide frequency band by concatenating an adjacent frequency band based on whether the adjacent frequency band is available. For example, when a 20 MHz band is a primary frequency band (main channel), a 20 MHz band (i.e., first adjacent band) adjacent to the primary frequency band is available, a 20 MHz band (i.e., second adjacent band) adjacent to the first adjacent band is unavailable, and a 20 MHz band (i.e., third adjacent channel) adjacent to the second adjacent band is available, data may be transmitted using a total of 40 MHz as a transmission band since the third adjacent channel is not contiguous with the main channel. In other words, since only the contiguous frequency bands are used as a data transmission band, an actual available frequency band is unable to be used. Additionally, the conventional radio access technology supports only one-to-one connection between one transmitting terminal and one receiving terminal for each transmission attempt within the same basic service set (BSS). Thus, the conventional radio access technology is inefficient since the conventional radio access technology does not operate based on differences in the connection environment or transmission data characteristics of the terminals.

The IEEE 802.11p is a technical standard developed for Intelligent Transport System (ITS) communications. The IEEE 802.11p uses the physical layer of the IEEE 802.11a, and the Media Access Control (MAC) layer of the IEEE 802.11p employs Enhanced Distributed Channel Access (EDCA) of the IEEE 802.11e. The channel bandwidth thereof is based on 10 MHz, and a 20 MHz channel is also available. The IEEE 802.11p supports 'outside context of BSS (OCB)' communication in which terminals can transmit and receive data without association with an access point.

When various versions of wireless LAN communication methods are mixed and used in a wireless LAN, mutual interference may occur, and thus performance may be degraded due to these problems. For example, in case that APs and terminals supporting the IEEE 802.11ac coexist in an area in which APs and terminals supporting the IEEE 802.11n operate, if an operation for mutual coexistence is not performed, interference or the like affects each other and performance is degraded.

The above-referenced technologies were described to enhance understanding of the background of the present disclosure. The above-referenced technologies may include information that does not quality as prior art with respect to the present application, and the above-referenced technologies are not necessarily known to those of ordinary skill in the art.

An objective of the present disclosure for solving the above-described problem is to solve the problem that performance of legacy communication nodes and new communication nodes is deteriorated when the legacy communication nodes supporting the conventional communication scheme and the new communication nodes supporting a new wireless LAN communication scheme are mixed and operated. That is, the present disclosure is to provide a method for mutual coexistence operation using a wireless LAN, and an apparatus and system for the same.

An operation method of a first communication node in a wireless communication network, according to an exemplary embodiment of the present disclosure for achieving the objective, may include: receiving a first frame according to a first communication protocol from a second communication node; determining whether hop count information is included in the first frame; in response to determining that the hop count information is not included in the first frame, generating and transmitting a second frame according to the first communication protocol, the second frame including hop count information set to an initial value; and configuring an operating state of the first communication node to a first state in which the first communication node operates according to the first communication protocol.

The second communication node may be an IEEE 802.11p legacy communication node, and the first communication protocol may be IEEE 802.11p.

The operation method may further include, when a frame according to the first communication protocol is not received from other communication nodes for a preset time period after transmitting the second frame, configuring the operating state of the first communication node to a second state of operating according to a second communication protocol.

The operation method may further include, when frames according to the first communication protocol are transmitted with a first transmission power a preset number of times in the first state, setting a transmission power of the first communication node to a second transmission power different from the first transmission power.

The operation method may further include, when a frame according to the first communication protocol is not received from other communication nodes for a preset time period after the transmission power of the first communication node is set to the second transmission power, setting the transmission power of the first communication node to the first transmission power.

The operation method may further include, when a frame according to the first communication protocol is received from other communication nodes within a preset time period after the transmission power of the first communication node is set to the second transmission power, maintaining the transmission power of the first communication node set to the second transmission power additionally for the preset time period.

The second frame may indicate the hop count information through at least one of a frame control field, a duration field, and a sequence control field of the second frame.

An operation method of a first communication node in a wireless communication network, according to an exemplary embodiment of the present disclosure for achieving the objective, may include: receiving a first frame according to a first communication protocol from a second communication node; identifying information on a hop count included in the first frame; in response to determining that the hop count is within a preset value, increasing the hop count, generating and transmitting a second frame according to the first communication protocol including information on the increased hop count, and configuring an operating state of the first communication node to a first state in which the first communication node operates according to the first communication protocol; and in response to determining that the hop count exceeds the preset value, configuring the operating state of the first communication node to a second state in which the first communication node operates according to a second communication protocol.

The information on the hop count may be information on a hop count between the second communication node and a legacy communication node.

The operation method may further include, when no frames are received from other communication nodes for a preset time period after transmitting the second frame, configuring the operating state of the first communication node to the second state.

The operation method may further include, when frames according to the first communication protocol are transmitted with a first transmission power a preset number of times in the first state, setting a transmission power of the first communication node to a second transmission power different from the first transmission power.

The operation method may further include, when a frame according to the first communication protocol is not received from other communication nodes for a preset time period after the transmission power of the first communication node is set to the second transmission power, setting the transmission power of the first communication node to the first transmission power.

The operation method may further include, when a frame according to the first communication protocol is received from other communication nodes within a preset time period after the transmission power of the first communication node is set to the second transmission power, maintaining the transmission power of the first communication node to the second transmission power additionally for the preset time period, wherein a hop count of the frame according to the first communication protocol is identical to the hop count of the first frame.

The operation method may further include, when a frame according to the first communication protocol transmitted from other communication nodes with a second transmission power lower than a transmission power of the first frame is received in the first state, setting a transmission power of the first communication node to the second transmission power.

The second frame may indicate hop count information of the second frame through at least one of a frame control field, a duration field, and a sequence control field of the second frame.

The second frame may further indicate information on a transmission power of the second frame through at least one of a frame control field, a duration field and a sequence control field of the second frame.

An operation method of a first communication node in a wireless communication network, according to an exemplary embodiment of the present disclosure for achieving the objective, may include: receiving a first frame according to a first communication protocol from a second communication node; identifying a hop count included in the first frame, the hop count indicating a hop count between the second communication node and a legacy communication node; and in response to determining that the hop count is equal to or less than a preset value, generating and transmitting a second frame according to the first communication protocol, and configuring an operating state of the first communication node to a first state in which the first communication node operates according to the first communication protocol.

The first frame may further include information of a received signal strength intensity (RSSI) of a frame transmitted from the legacy communication node at the second communication node.

The operation method may further include, in response to determining that the hop count is less than or equal to the preset value and the RSSI is less than a preset value, configuring the operating state of the first communication node to a second state of operating according to a second communication protocol.

The second frame may indicate information on the hop count of the second frame and an RSSI of the first frame at the first communication node through at least one of a frame control field, a duration field, and a sequence control field of the second frame of the second frame.

Advantageous Effects

According to the present disclosure, when performing communication outside a context of a basic service set, that is, OCB communication in which legacy communication nodes and new communication nodes perform communication without association with a wireless access point AP, it is made possible to achieve effects of reducing interferences and preventing unnecessary delays by enabling mutual coexistence.

DETAILED DESCRIPTION

Figure 1:
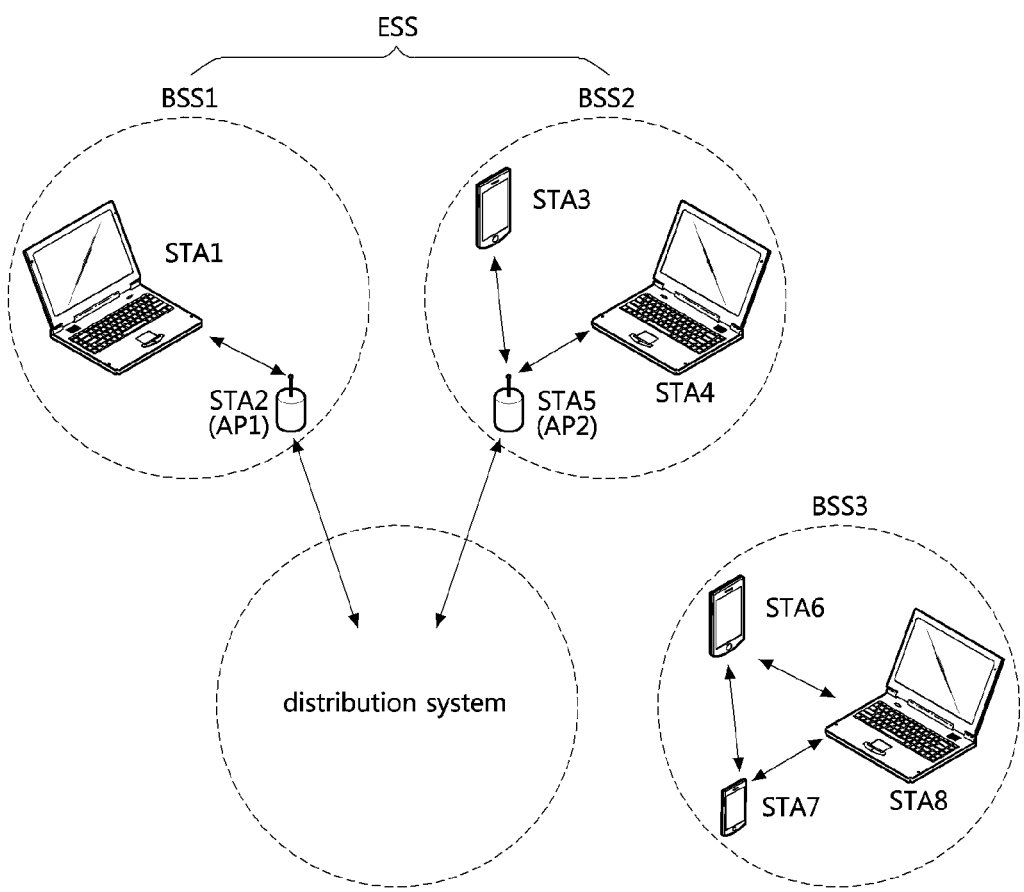
FIG. 1 is a diagram illustrating a first exemplary embodiment of a WLAN system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A communication system (e.g., a WLAN system) to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. The communication system may be used in the same sense as the communication network.

FIG. 1 is a diagram illustrating a first exemplary embodiment of a WLAN system.

As shown in FIG. 1, a WLAN system may include at least one basic service set (BSS). The BSS denotes a set of stations (STAs) (e.g., STA1, STA2 (i.e., AP1), STA3, STA4, and STA5 (i.e., AP2), STA6, STAT, and STAB) configured to communicate with each other through successful synchronization. The BSS does not necessarily denote a specific area. In exemplary embodiments below, a station that performs a function of an access point may be referred to as an "access point (AP)", and a station that does not perform the function of an access point may be referred to as a "non-AP station" or "station".

The BSSs may be classified as infrastructure BSSs and independent BSSs (IBSSs). In particular, a BSS1 and a BSS2 may be infrastructure BSSs, and a BSS3 may be an IBSS. The BSS1 may include the station STA1, the access point STA2 (i.e., AP1) that provides a distribution service, and a distribution system (DS) that connects the plurality of access points STA2 (i.e., AP1) and STA5 (i.e., AP2). In the BSS1, the access point STA2 (i.e., AP1) may manage the STA1.

The BSS2 may include the STA3 and the STA4, the access point STA5 (i.e., AP2) that provides the distribution service, and the distribution system that connects the plurality of access points STA2 (i.e., AP1) and STA5 (i.e., AP 2). In the BSS2, the access point STA5 (i.e., AP2) may manage the STA3 and the STA4.

The BSS3 may be an IBSS operating in an ad-hoc mode. In the BSS3, there is no AP that performs a management function at a center. In other words, in the BSS3, the stations STA6, STA7, and STA8 may be managed in a distributed manner. In the BSS3, all the stations STA6, STA7, and STA8 may be mobile stations and may be not permitted to connect to the DS, thus forming a self-contained network.

The access points STA2 (i.e., AP1) and STA5 (i.e., AP2) may provide access to the DS via a wireless medium for the stations STA1, STA3, and STA4 connected thereto. Communications between the stations STA1, STA3, and STA4 in the BSS 1 or the BSS2 may be generally performed via the access points STA2 (i.e., AP1) and STA5 (i.e., AP2), but when a direct link is established, direct communications between the stations STA1, STA3, and STA4 are also possible.

A plurality of infrastructure BSSs may be interconnected via a DS. A plurality of BSSs connected via a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from one BSS to another BSS while performing seamless communication.

The DS is a mechanism for one AP to communicate with another AP. The AP may be configured to transmit a frame for stations connected to a BSS managed by the AP or transmit a frame for an arbitrary station having moved to another BSS. Additionally, the AP may be configured to exchange frames with an external network, such as a wired network. The DS is not necessarily a network, and may have any form capable of providing a predetermined distribution service defined in the IEEE 802.11 standard. For example, the DS may be a wireless network, such as a mesh network, or a physical structure that connects APs with each other. Each of the communication nodes STA1, STA2 (i.e., AP1), STA3, STA4, STA5 (i.e., AP2), STA6, STA7, and STA8 included in the WLAN system may be configured as follows.

Figure 2:
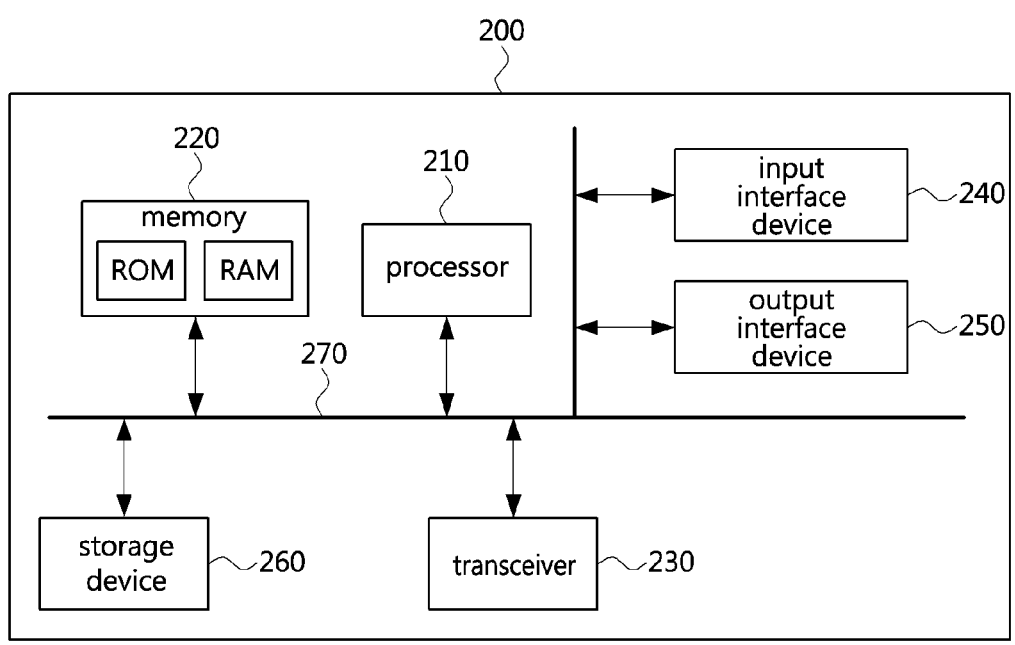
FIG. 2 is a block diagram illustrating an exemplary embodiment of a communication node constituting a WLAN system.

FIG. 2 is a block diagram illustrating an exemplary embodiment of a communication node configured as a WLAN system.

As shown in FIG. 2, a communication node 200 may include at least one processor 210, a memory 220, and a transceiver 230 connected to a network for performing communications. The transceiver 230 may also be referred to as a "radio frequency (RF) unit", "RF module", or the like. Additionally, the communication node 200 may further include an input interface device 240, an output interface device 250, a storage device 260, and the like. Each component included in the communication node 200 may be configured to communicate with each other as connected via a common bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may be configured to execute at least one instruction stored in at least one of the memory 220 and the storage device 260. The processor 210 may refer to a central processing unit (CPU), a graphics processing unit (GPU), or a dedicated processor. Methods in accordance with exemplary embodiments of the present disclosure may be performed by the processor 210. Each of the memory 220 and the storage device 260 may include at least one of a volatile storage medium and a non-volatile storage medium. For example, the memory 220 may include at least one of read-only memory (ROM) and random access memory (RAM).

Meanwhile, in the WLAN system, an association procedure may be performed as follows.

Figure 3:
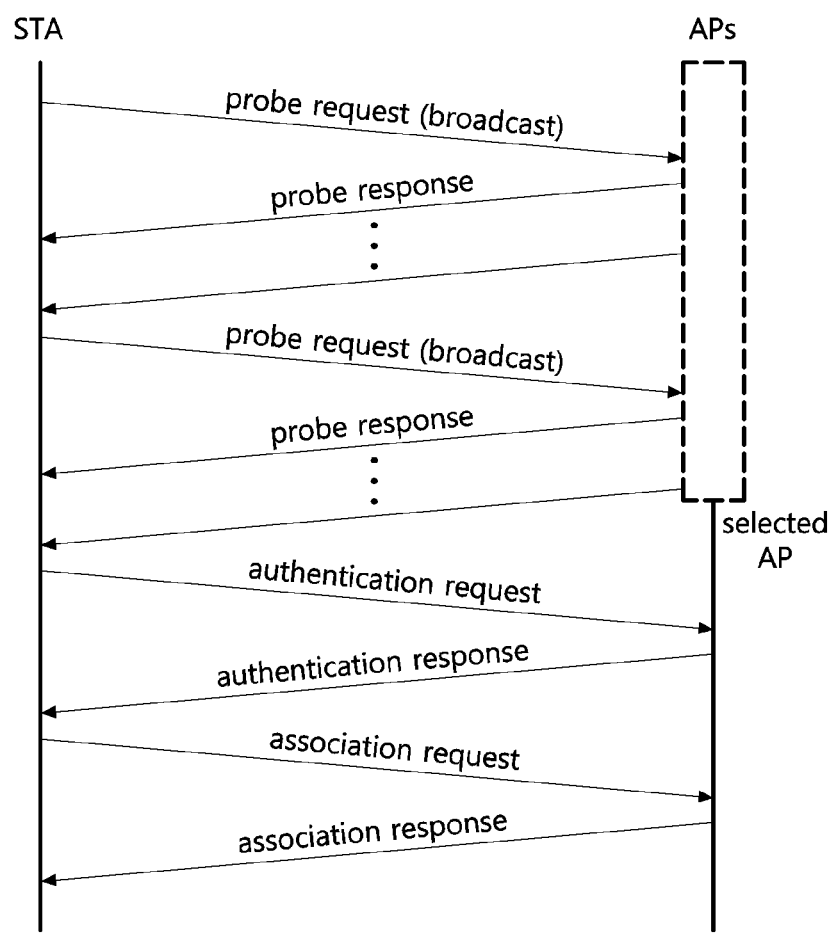
FIG. 3 is a sequence chart illustrating an association procedure of a station in a WLAN system according to an exemplary embodiment.

FIG. 3 is a sequence chart illustrating an association procedure of a station in a WLAN system.

As shown in FIG. 3, an association procedure of a station STA in an infrastructure BSS may generally be divided into a probe step of probing an AP, an authentication step for authentication with the probed AP, and an association step of associating with the authenticated AP.

The station STA may be configured to first probe neighboring APs with a probe process. The probe process may be performed in a passive scanning scheme or an active scanning scheme. The passive scanning scheme may be performed by overhearing beacons transmitted by the neighboring APs. Additionally, the active scanning scheme may be performed by broadcasting a probe request frame. The APs receiving the probe request frame may be configured to transmit probe response frames that correspond to the probe request frame to the station STA. The station STA may be configured to recognize the presence of the neighboring APs by receiving the probe response frames.

Subsequently, the station STA may be configured to perform an authentication with a probed AP, and perform an authentication with the plurality of probed APs. Authentication algorithms conforming to an IEEE 802.11 standard are classified as an open system algorithm for exchanging two authentication frames and a shared key algorithm for exchanging four authentication frames. The station STA may be configured to complete an authentication with an AP by exchanging an authentication request frame and an authentication response frame based on the authentication algorithms according to an IEEE 802.1 standard.

When authentication with the access point (AP) is completed, the station STA may be configured to perform an association step with the access point (AP). In particular, the station STA may be configured to select one access point AP among authenticated access points APs, and perform the association step with the selected access point AP. In other words, the station STA may be configured to transmit an association request frame to the selected AP and receive an association response frame that is a response to the association request frame from the selected AP, and thus, the association with the selected AP may be completed.

Meanwhile, a communication node (e.g., access point, station, etc.) belonging to the WLAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may be classified into an association request frame, an association response frame, a reassociation request frame, a reassociation response frame, a probe request frame, a probe response frame, a beacon frame, and an association. Additionally, the management frame may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frame. The QoS data frame may be configured to indicate a data frame for transmission based on the QoS, and the non-QoS data frame may be configured to indicate a data frame for transmission not based on the QoS.

Meanwhile, in the WLAN system, a communication node (e.g., access point or station) may be configured to operate based on the EDCA.

Figure 4:
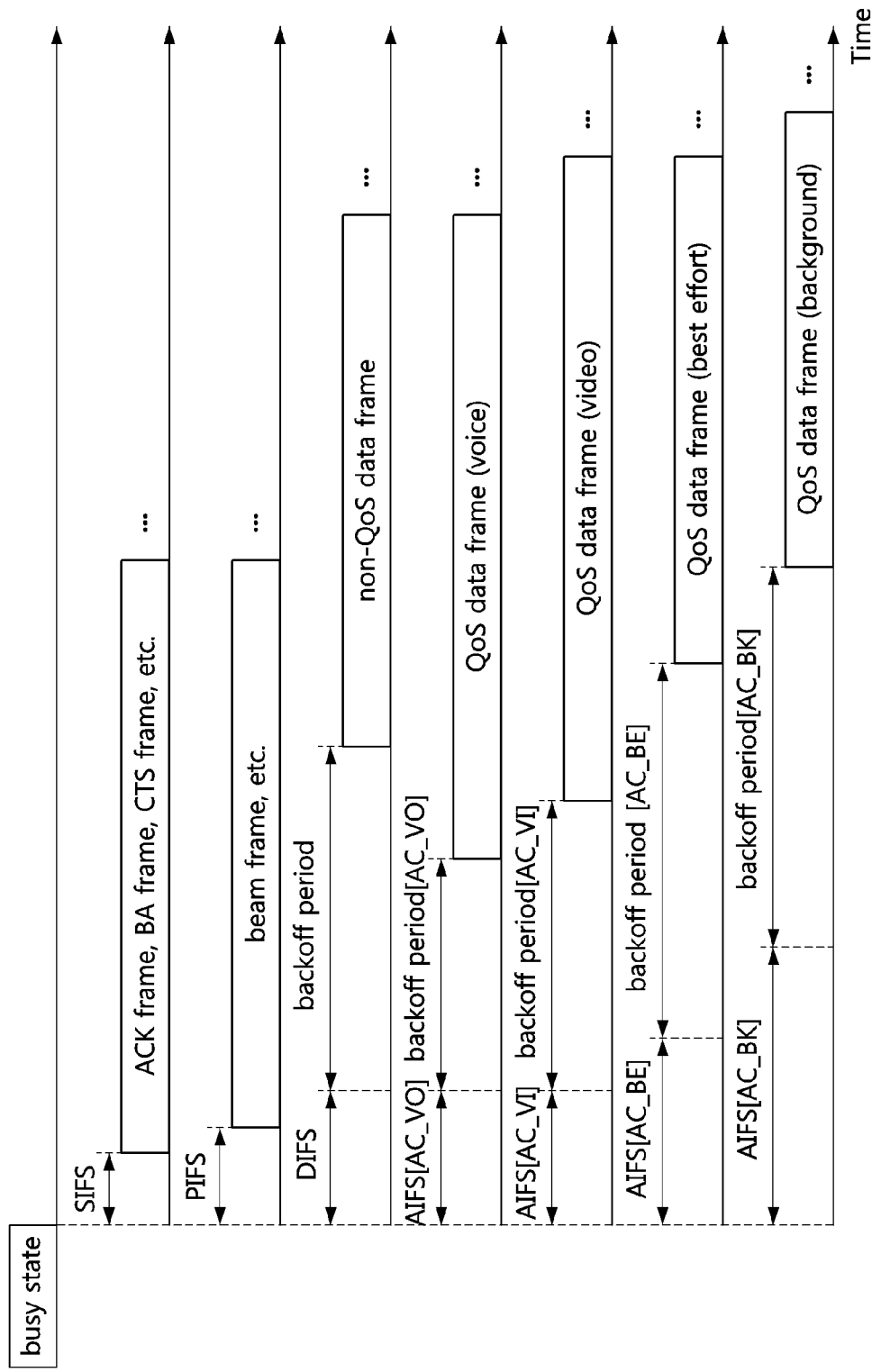
FIG. 4 is a timing diagram illustrating a first exemplary embodiment of an operation method of a communication node based on an EDCA.

FIG. 4 is a timing diagram illustrating a first exemplary embodiment of an operation method of a communication node based on an EDCA.

As shown in FIG. 4, a communication node that wants to transmit a control frame (or a management frame) may be configured to perform a monitoring operation (e.g., carrier sensing operation) on a channel state during a predetermined period (e.g., a short interframe space (SIFS) or a PCF IFS (PIFS)). When the channel state is determined to be an idle state during the predetermined period (e.g., SIFS or PIFS), the communication node may be configured to transmit a control frame (or a management frame). For example, the communication node may be configured to transmit an ACK frame, a BA frame, a CTS frame, or the like when the channel state is determined to be an idle state during an SIFS. Additionally, the communication node (e.g., AP) may be configured to transmit a beacon frame or the like when the channel state is determined to be an idle state during a PIFS. When the channel state is determined to be busy during the predetermined period (e.g., SIFS or PIFS), the communication node may be configured to not transmit a control frame (or a management frame). In particular, the carrier sensing operation may be referred to as a "clear channel assessment (CCA) operation".

A communication node intending to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure, and perform the monitoring operation (e.g., carrier sensing operation) during a period that corresponds to the selected backoff value. The communication node may be configured to transmit a non-QoS data frame when the channel state is determined to be an idle state during the backoff period.

A communication node intending to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., a protocol data unit (PDU)) included in the QoS data frame. The AC of the data unit may be as shown in Table 1 below.

TABLE 1

| Priority | AC | Description |
| --- | --- | --- |
| Lowest | AC_BK | Background |
| . | AC_BE | Best effort |
| . | AC_VI | Video |
| Highest | AC_VO | Voice |

As shown in Table 1, AC_BK may indicate background data, AC_BE may indicate data transmitted in a best effort manner, AC_VI may indicate video data, and AC_VO may indicate voice data. For example, the length of the AIFS for the QoS data frame of each of AC_VO and AC_VI may be set equal to the length of the DIFS. The length of the AIFS for the QoS data frame of AC_BE and AC_BK may be set longer than the length of the DIFS. The length of the AIFS for the QoS data frame of AC_BK may be set longer than the length of the AIFS for the QoS data frame of AC_BE.

In the random backoff procedure, the communication node may be configured to select a backoff value (e.g., backoff counter) within a contention window based on the AC of the QoS data frame. The contention window based on the AC may be as shown in Table 2 below. As shown below, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
| --- | --- | --- |
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be in an idle state during the backoff period.

Hereinafter, WLAN multi-channel operation methods in a communication system will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a non-AP station is described, the corresponding AP may be configured to perform an operation that corresponds to the operation of the non-AP station. Conversely, when an operation of the AP is described, the corresponding non-AP station may be configured to perform an operation that corresponds to the operation of the AP.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

Figure 5:
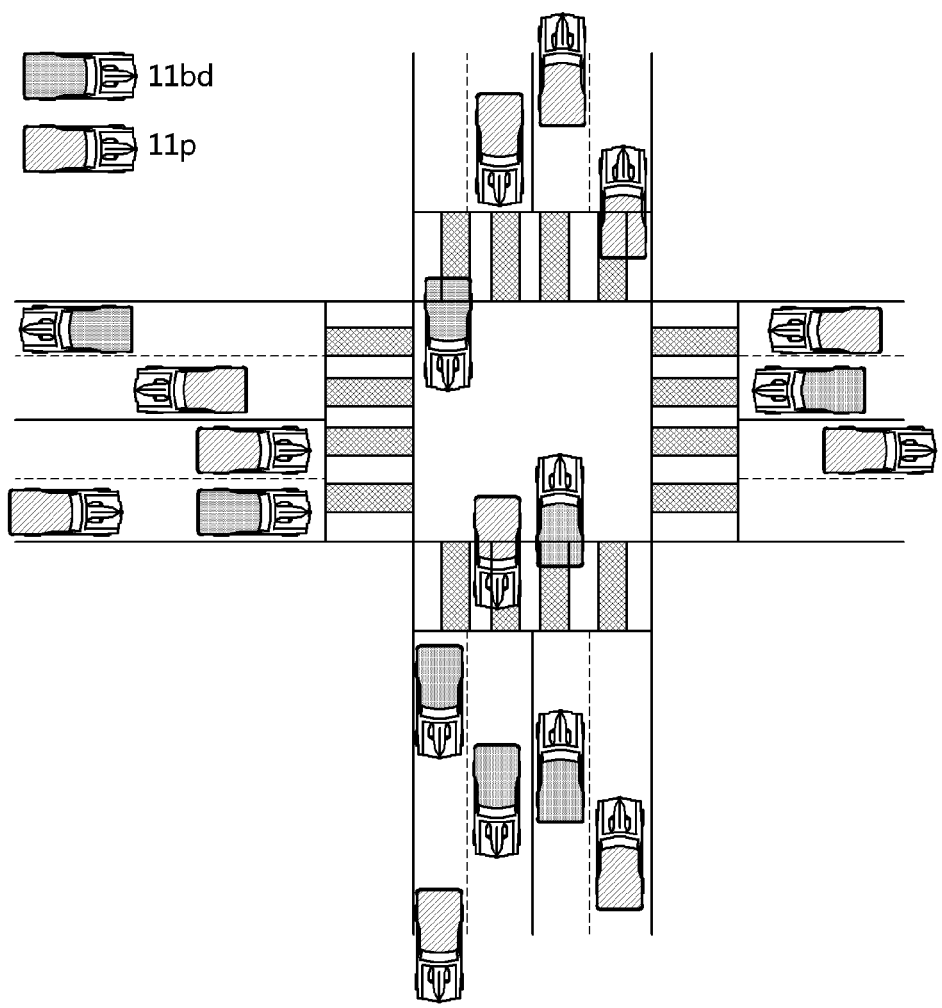
FIG. 5 is a diagram illustrating an exemplary embodiment of a communication system in which legacy communication nodes and new communication nodes coexist.

FIG. 5 is a diagram illustrating an exemplary embodiment of a communication system in which legacy communication nodes and new communication nodes coexist.

As shown in FIG. 5, moving entities (e.g., vehicles, etc.) equipped with communication nodes of the present disclosure may transmit data frames including driving information such as their own speeds and movement directions periodically or when a specific condition is satisfied. Legacy communication nodes may transmit and receive data frames using the existing communication protocol (e.g., 802.11p, etc.). In addition, new communication nodes may transmit/receive data frames using a new communication protocol (e.g., 802.11bd).

Figure 6A:
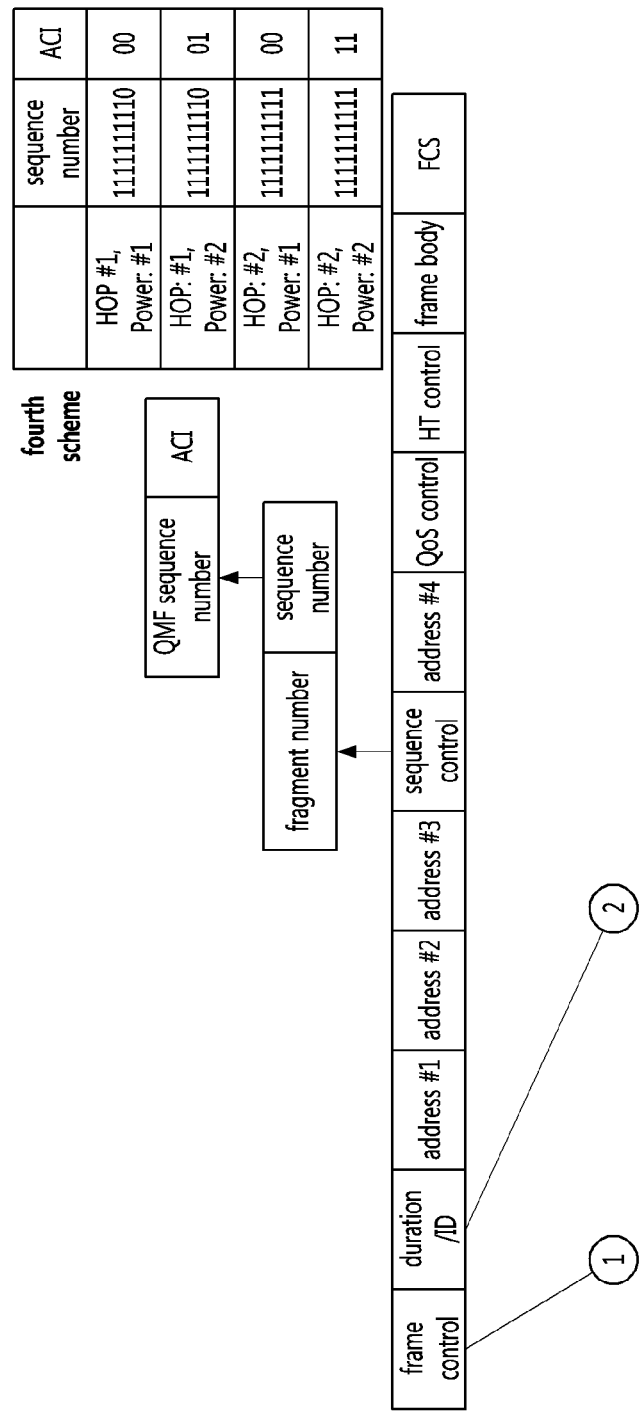
FIG. 6A is a diagram illustrating a first exemplary embodiment of a configuration of a legacy frame generated by a new communication node.
Figure 6B:
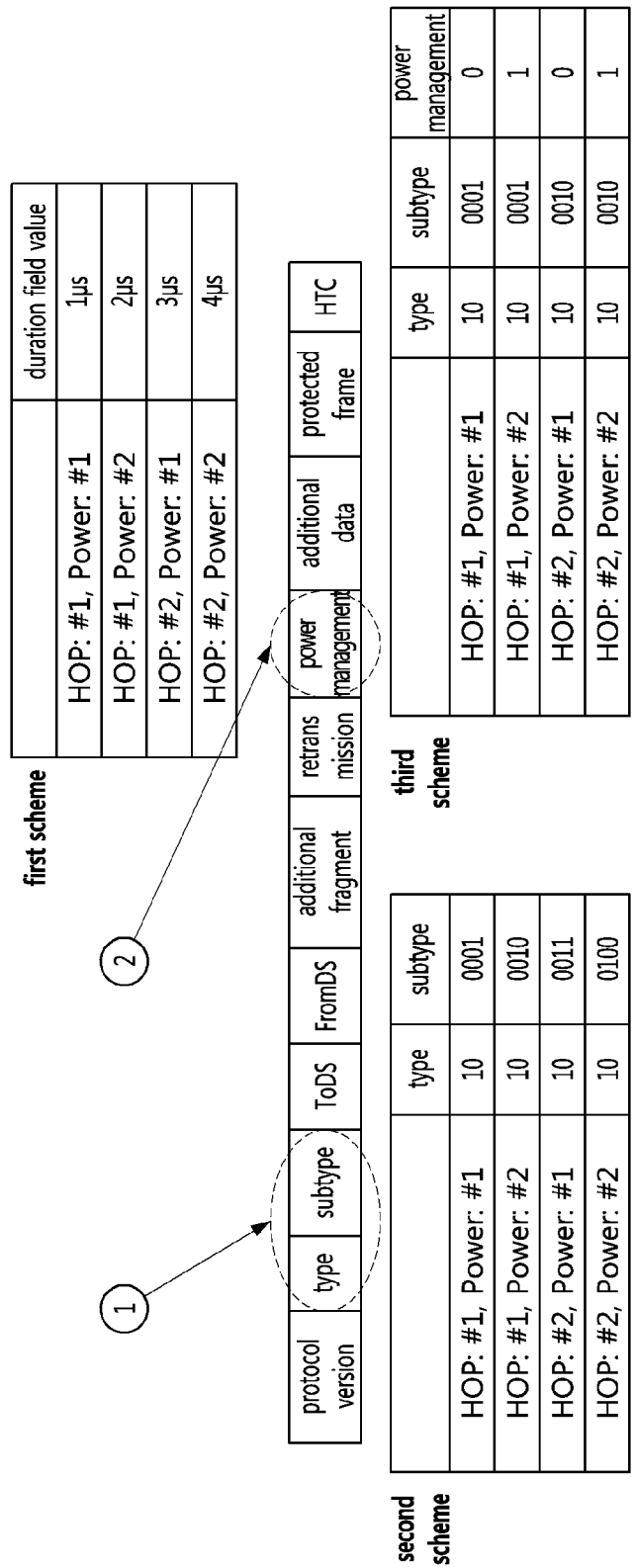
FIG. 6B is a diagram illustrating a first exemplary embodiment of a configuration of a legacy frame generated by a new communication node.

FIGS. 6A and 6B are diagrams illustrating a first exemplary embodiment of a configuration of a legacy frame generated by a new communication node.

As shown in FIGS. 6A and 6B, a frame transmitted and received by communication nodes (legacy communication nodes and new communication nodes) may include a frame control field, a duration/ID field, at least one receiver address field, a sequence control field, a quality of service (QoS) control field, and a high throughput (HT) control field.

A legacy frame generated by a new communication node may further include a hop count value indicating the number of hops between a legacy communication node and the new communication node, and a transmission power value, so that the legacy frame is distinguished from a legacy frame transmitted by a legacy communication node. The transmission power value may indicate a transmission power of the frame generated by the new communication node. The frame of FIGS. 6A and 6B may indicate the hop count as #1 or #2, and indicate the transmission power as one of two values. In particular, the new communication node may indicate the transmission power as (Power: #1) or (Power: #2), and coverages of frames transmitted by applying different transmission powers may be different from each other.

In order to indicate that it is a legacy frame transmitted by a new communication node, the new communication node may configure indicators in a MAC header of the frame, which are not defined in the conventional (legacy) standard.

According to an exemplary embodiment of the present disclosure, the new communication node may indicate a hop count and a transmission power by setting a duration value of the MAC header to a value different from that of the legacy standard. According to the legacy standard, one OFDM symbol time of a 10 MHz channel according to the IEEE 802.11p may be 8 μs. Therefore, the communication node may set the duration value to a value less than 8 μs to indicate a hop count and a transmission power of the frame. For example, the communication node may indicate (HOP: #1, Power: #1) by setting the duration value to 1. The communication node may indicate (HOP: #1, Power: #2) by setting the duration value to 2. The communication node may indicate (HOP: #2, Power: #1) by setting the duration value to 3. The communication node may indicate (HOP: #2, Power: #2) by setting the duration value to 4.

According to another exemplary embodiment of the present disclosure, the new communication node may set the value of the frame control field of the MAC header to a combination of a type and a subtype, which is different from that of the conventional standard. Specifically, the communication node may set a hop count and a transmission power of the frame by setting 6 bits including a 2-bit type field and a 4-bit subtype field included in the frame control field. For example, the communication node may indicate (HOP: #1, Power: #1) by setting the values of the type field and the subtype field to '100001'. The communication node may indicate (HOP: #1, Power: #2) by setting the values of the type field and the subtype field to '100010', and may indicate (HOP: #2, Power: #1) by setting the values of the type field and the subtype field to '100011'. The communication node may indicate (HOP: #2, Power: #2) by setting the values of the type field and the subtype field to '100100'.

According to another exemplary embodiment of the present disclosure, the new communication node may set the value of the frame control field of the MAC header to a combination of a type and a subtype, which is different from that of the legacy standard. Specifically, the communication node may set a hop count and a transmission power of the frame through a combination of the 2-bit type field, the 4-bit subtype field, and a 1-bit power management field value included in the frame control field. For example, the communication node may indicate (HOP: #1) by setting the values of the type and subtype fields to '100001', and may indicate the (HOP: #2) by setting the values of the type and subtype fields to '100010'. In addition, the communication node may set the power management field value to 0 to indicate (Power: #1) of the frame, and may set the power management field value to 1 to indicate (Power: #2) of the frame.

According to another exemplary embodiment of the present disclosure, the new communication node may set the value of the sequence number field to one of preset values.

The communication node may set a hop count and a transmission power of the frame by setting the sequence number and an access category index (ACI) value of the sequence number field to preset values. For example, the communication node may set the sequence number to '111111110' to indicate (HOP: #1), and may set the sequence number to '111111111' to indicate (HOP: #2). In addition, the communication node may set the value of the ACI field to '00' to indicate (Power: #1) of the frame, and may set the value of the ACI field to '11' to indicate (Power: #2) of the frame. Alternatively, the communication node may set a different hop count and transmission power by fixing the ACI value and setting one of four different values of the sequence number field.

The new communication nodes may transmit and receive the frame including the structure shown in FIGS. 6A and 6B, and may transition an operating state based on a result of the frame transmission/reception. The operation of the communication nodes transitioning the operating state and the respective operating states may be as described below.

Figure 7:
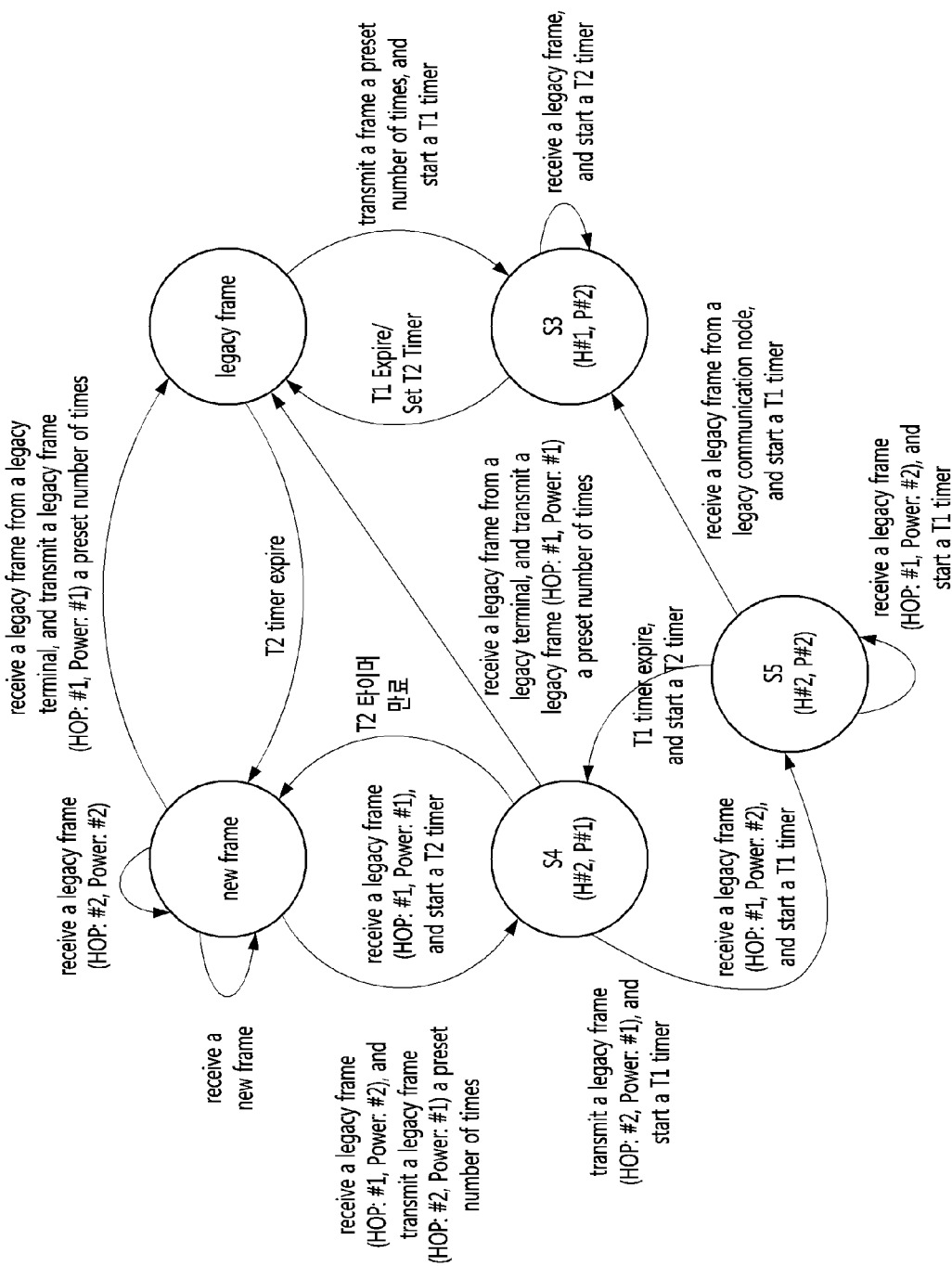
FIG. 7 is a diagram illustrating a first exemplary embodiment of operating states and transitions therebetween of a new communication node transmitting a legacy frame.

FIG. 7 is a diagram illustrating a first exemplary embodiment of operating states and transitions therebetween of a new communication node transmitting a legacy frame.

As shown in FIG. 7, the new communication node may operate in one of five operating states S1, S2, S3, S4, and S5. A frame transmission scheme of the new communication node may vary depending on the operating state of the new communication node. Table 3 below is a description of each operating state.

TABLE 3

| State | Transmission frame format | Transmission range |
| --- | --- | --- |
| S1 | New (IEEE 802.11bd) | |
| S2 | Legacy (HOP: #1, Power: #1) | Long transmission range |
| S3 | Legacy (HOP: #1, Power: #2) | Short transmission range |
| S4 | Legacy (HOP: #2, Power: #1) | Long transmission range |
| S5 | Legacy (HOP: #2, Power: #2) | Short transmission range |

The new communication node may transmit and receive a new frame to and from other new communication nodes. The new communication node transmitting and receiving a new frame may operate in the S1 state. In addition, when a new frame (e.g., frame according to the standard defined in the IEEE 802.11bd) is received from another new communication node, the new communication node may operate continuously in the S1 state.

The new communication node may receive a legacy frame according to the conventional standard from a legacy communication node. The communication node receiving the legacy frame may transition to the S2 state. The communication node operating in the S2 state may periodically transmit a frame to other communication nodes a preset number of times when there is a message to be transmitted. The new communication node operating in the S2 state may add an indicator indicating (HOP: #1, Power: #1) to a legacy frame. The state of using (Power: #1) may be a state using a new transmission scheme, in which a transmission distance is longer than the conventional one.

The new communication node that has transmitted the frame to other communication nodes a preset number of times may transition from the S2 state to the S3 state. The new communication node transitioned to the S3 state may start a T1 timer. The new communication node operating in the S3 state may add an indicator indicating (HOP: #1, Power: #2) to a legacy frame. The state of using (Power: #2)

may be a state using the conventional transmission scheme, in which a transmission distance is the same as the existing transmission distance.

When a legacy frame is received from a legacy communication node in the S3 state, the new communication node may maintain the S3 state. The new communication node receiving a legacy frame may cancel the running T1 timer and restart a T1 timer. When the T1 timer expires in the S3 state, the new communicate node may transition to the S2 state and start a T2 timer. When the T2 timer expires in the S2 state, the new communication node may transition to the S1 state.

When a new frame is received in the S1 state or a legacy frame indicating (HOP: #2, Power: #2) is received, the new communication node may maintain the S1 state. When the new communication node in the S1 state receives a legacy frame indicating (HOP: #1, Power: #1 or #2), the new communication node may transition to the S4 state.

When the new communication node operating in the S1 state transitions to the S4 state by receiving a legacy frame indicating (HOP: #1, Power: #1), the new communication node may set a T2 timer.

When the new communication node operating in the S1 state transitions to the S4 state by receiving a legacy frame indicating (HOP: #1, Power: #2) in the S1 state, the new communication node may transmit a legacy frame indicating (HOP: #2, Power: #1) a preset number of times.

When the new communication node operating in the S4 state receives a legacy frame indicating (HOP: #1, Power: #2), the new communication node may transmit a legacy frame indicating (HOP: #2, Power: #2) a preset number of times.

When the new communication node operating in the S4 state receives a legacy frame from a legacy communication node, the new communication node may transition to the S2 state, and transmit a legacy frame indicating (HOP: #1, Power: #1) a preset number of times.

When the new communication node operating in the S4 state transmits a legacy frame indicating (HOP: #2, Power: #1) a preset number of times, the new communication node may transition to the S5 state. The new communication node transitioned to the S5 state may start a T1 timer.

When the communication node operating in the S1 state transitions to the S4 state by receiving a legacy frame indicating (HOP: #1, Power: #1), the new communication node may start a T2 counter. The new communication node receiving a legacy frame indicating (HOP: #1, Power: #2) during the operation of the T2 timer may transition to the S5 state.

When the new communication operating in the S5 state receives a legacy frame indicating (HOP: #1, Power: #2), the new communication node may maintain the S5 state. The new communication node may cancel the T1 timer and start a T1 timer again. When the new communication operating in the S5 state receives a legacy frame from a legacy communication node, the new communication node may transition to the S3 state. The new communication node transitioned to the S3 state may start a T1 timer. When the T1 timer expires in the S5 state, the new communication node may transition to the S4 state and may start a T2 timer. When the T2 timer expires in the S4 state, the new communication node may transition to the S1 state.

FIGS. 8A to 8H are diagrams illustrating an operation of a new communication node transitioning an operating state according to a first exemplary embodiment of the present disclosure.

As shown in FIGS. 8A to 8H, a mutual coexistence communication system may be a communication system in which new communication nodes (i.e., IEEE 802.11bd STAs) and legacy communication nodes (i.e., IEEE 802.11p STAs) coexist. The new communication node 11bd may transmit and receive a frame using a new frame format and transmission scheme, and the legacy communication node 11p may transmit and receive a frame using a legacy frame format and transmission scheme. The transmission/reception operation and range of the new frame may be shown as a circle denoted by a line indicated by '11bd', and the transmission/reception operation and range of the legacy frame may be shown as a circle denoted by a line indicated by '11p'. In addition, '11p (NGV)' may show the transmission/reception operation and range of the legacy frame generated by the new communication nodes, and as described above, the legacy frame may further include information on a hop count and a transmission power.

Figure 8A:
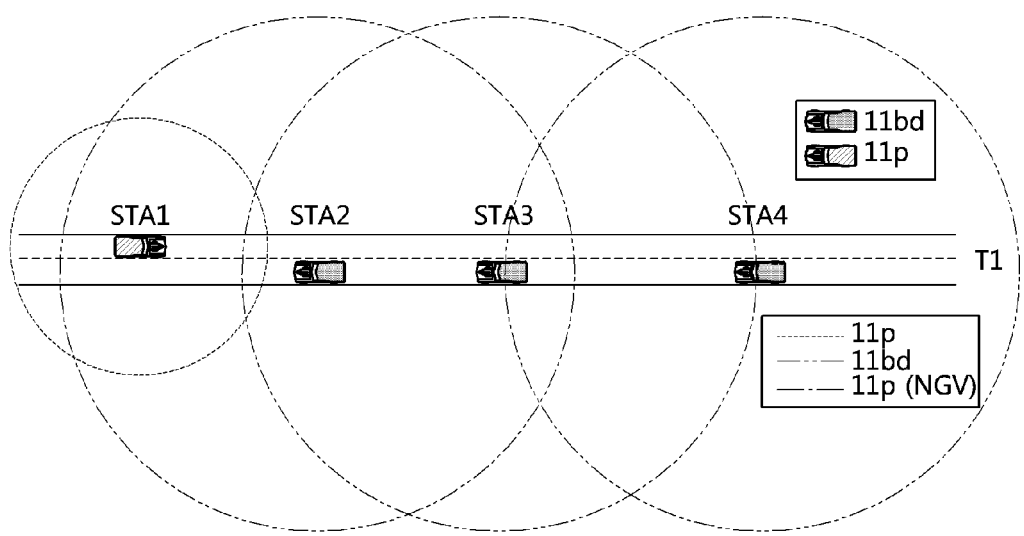
FIG. 8A is a diagram illustrating an operation of a new communication node transitioning an operating state according to a first exemplary embodiment of the present disclosure.

In FIG. 8A, new communication nodes STA2 to STA4 may be located outside a communication coverage of a legacy communication node STA1. Accordingly, the new communication nodes may not receive a legacy frame, and may operate in the S1 state of FIG. 7.

Figure 8B:
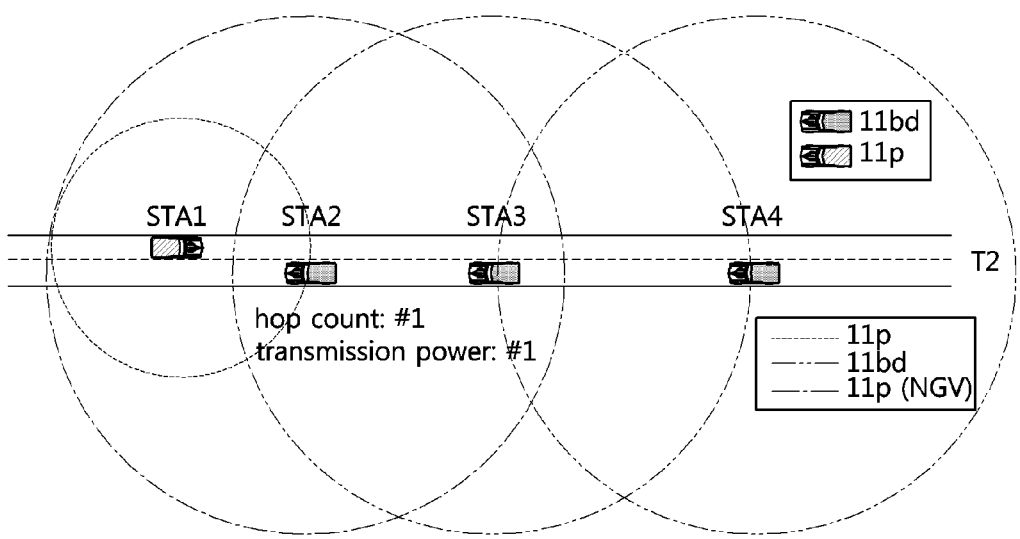
FIG. 8B is a diagram illustrating an operation of a new communication node transitioning an operating state according to a second exemplary embodiment of the present disclosure.

In FIG. 8B, the STA2 among the new communication nodes may be located within the communication coverage of the legacy communication node STA1. The STA2 may receive a legacy frame from the legacy communication node STA1. Upon receiving the legacy frame, the STA2 may recognize the legacy communication node STA1. Accordingly, the STA2 may configure a frame to enable communication with the legacy communication node.

Upon receiving the legacy frame, the STA2 may operate in the S2 state of FIG. 7. The STA2 operating in the S2 state may transmit a frame including an indicator indicating a hop count and a transmission power and following the legacy frame standard to the STA3 and STA4 a preset number of times. That is, the STA2 may transmit the legacy frame at least once or more by adding an indicator indicating (HOP: #1, Power: #1) to the legacy frame. The method of indicating a hop count and a transmission power through the legacy frame may be one of the first to fourth schemes shown in FIGS. 6A and 6B. Each transmission event may refer to an event in which a frame including the same or different data to be transmitted is transmitted a preset number of times. Since the legacy communication node receiving the frame of the STA2 cannot interpret the indicator, the legacy communication node may recognize the frame of the STA2 as a legacy frame, but the new communication node may recognize the hop count and transmission power of the frame.

Figure 8C:
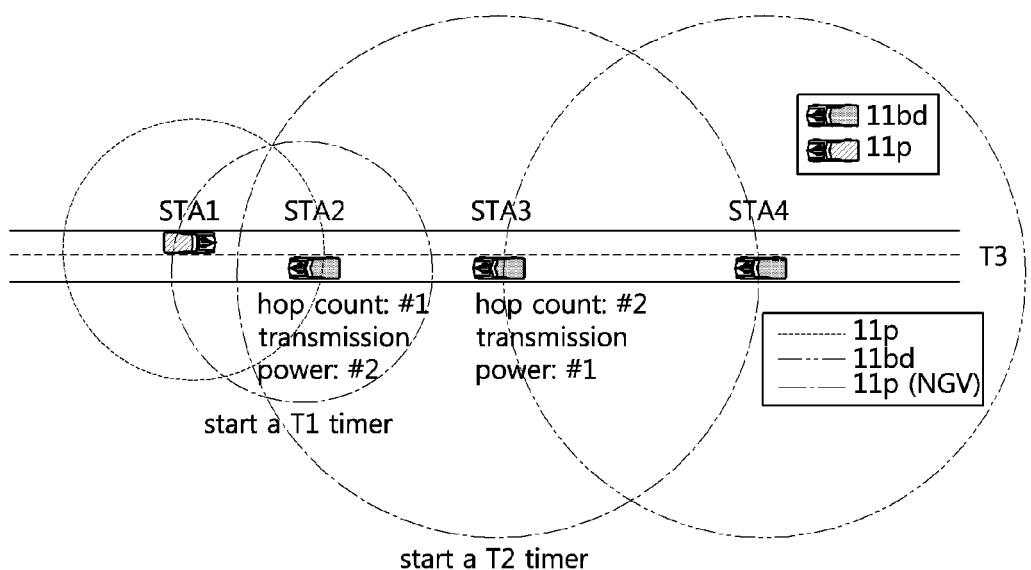
FIG. 8C is a diagram illustrating an operation of a new communication node transitioning an operating state according to a third exemplary embodiment of the present disclosure.

In FIG. 8C, the STA2 that has transmitted the legacy frame a preset number of times may transition its operating state and change the hop count and the transmission power indicator of the legacy frame. That is, the STA2 may operate in the S3 state of FIG. 7 and may start a T1 timer. The STA2 operating in the S3 state may by adding an indicator indicating (HOP: #1, Power: #2) to a legacy frame, and transmit the legacy frame a preset number of times. The communication coverage of the frame transmitted by the STA2 in the S3 state may be the same as the communication coverage of the legacy communication node. When the new communication node operating in the S3 state does not receive a legacy frame while the T1 timer is running, the new communication node may transition to the S2 state. The new communication node operating in the S2 state may transmit a legacy frame indicating (HOP: #1, Power: #1).

Figure 8D:
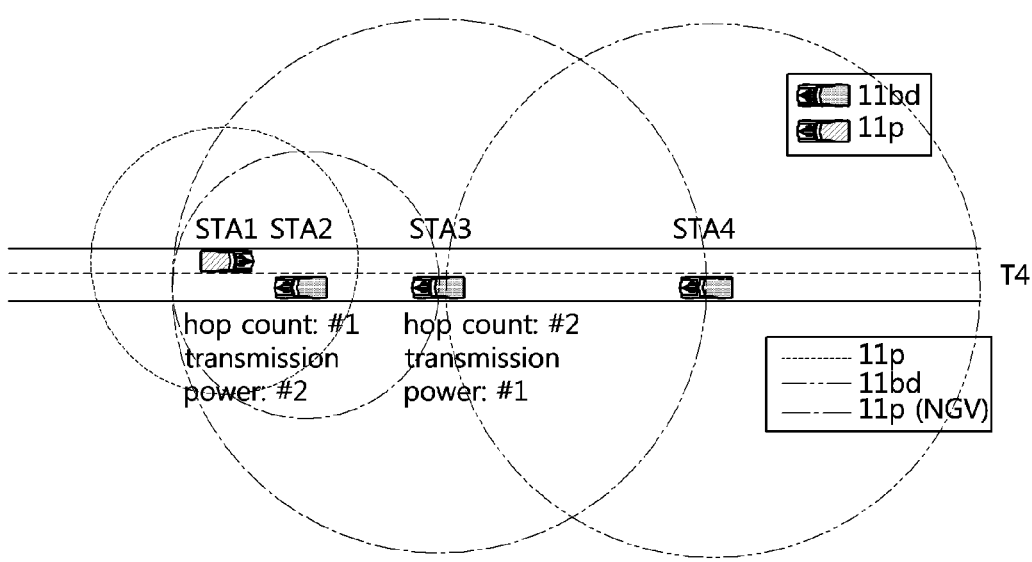
FIG. 8D is a diagram illustrating an operation of a new communication node transitioning an operating state according to a fourth exemplary embodiment of the present disclosure.

In FIG. 8D, the STA3, which is a new communication node, may receive the legacy frame indicating (HOP: #1, Power: #2) from the STA 2. Upon receiving the legacy frame from the STA2, the STA3 may transition to the S4 state and operate in the S4 state. The STA3 operating in the S4 state may transmit a legacy frame indicating (HOP: #2, Power: #1). The STA3 transitioned to the S4 state may start a T2 timer. If the STA3 for which the T2 timer is running does not receive a legacy frame, the STA3 may transition to the S1 state and operate in the S1 state.

Figure 8E:
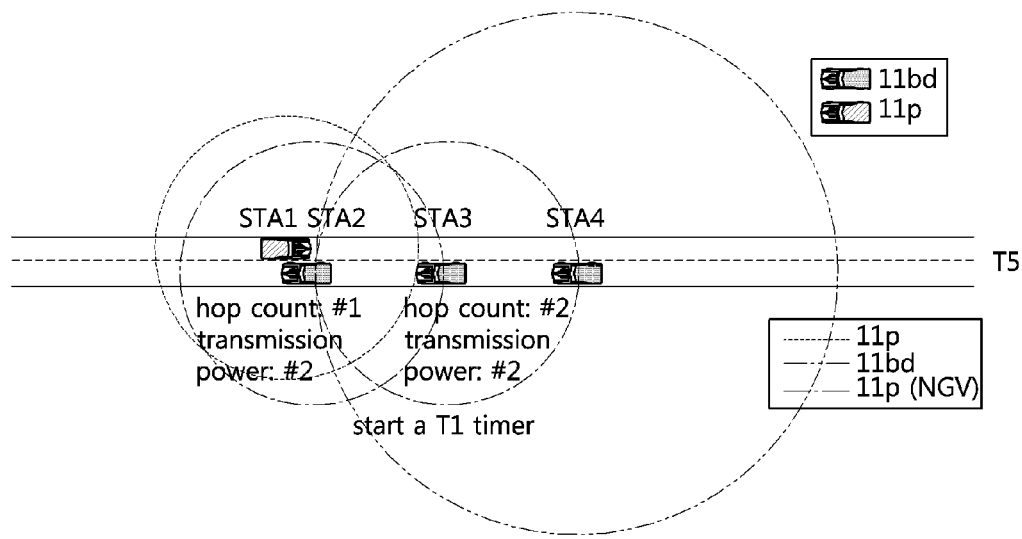
FIG. 8E is a diagram illustrating an operation of a new communication node transitioning an operating state according to a fifth exemplary embodiment of the present disclosure.

In FIG. 8E, before the expiration of the T2 timer, the STA3 may receive a legacy frame indicating (HOP: #1, Power: #2) from another new communication node (e.g., STA2). Upon receiving the legacy frame indicating (HOP: #1, Power: #2), the STA3 may transition to the S5 state and operate in the state S5. The STA3 operating in the S5 state may start a T1 timer. The STA3 may operate in the S5 state and may transmit a legacy frame indicating (HOP: #2, Power: #2).

Figure 8F:
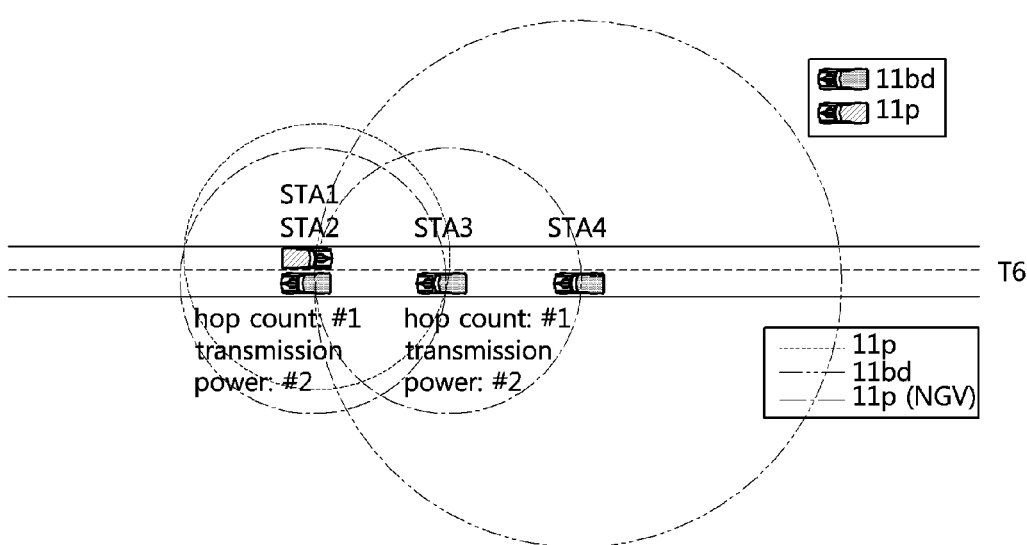
FIG. 8F is a diagram illustrating an operation of a new communication node transitioning an operating state according to a sixth exemplary embodiment of the present disclosure.

In FIG. 8F, the STA3 operating in the S5 state may receive a legacy frame from the legacy communication node STA'. Upon receiving the legacy frame, the STA3 may transition to the S3 state, and operate in the S3 state. In addition, the STA3 may initialize the operation of the T1 counter. The STA3 operating in the S3 state may transmit a legacy frame indicating (HOP: #1 and Power: #2).

Figure 8G:
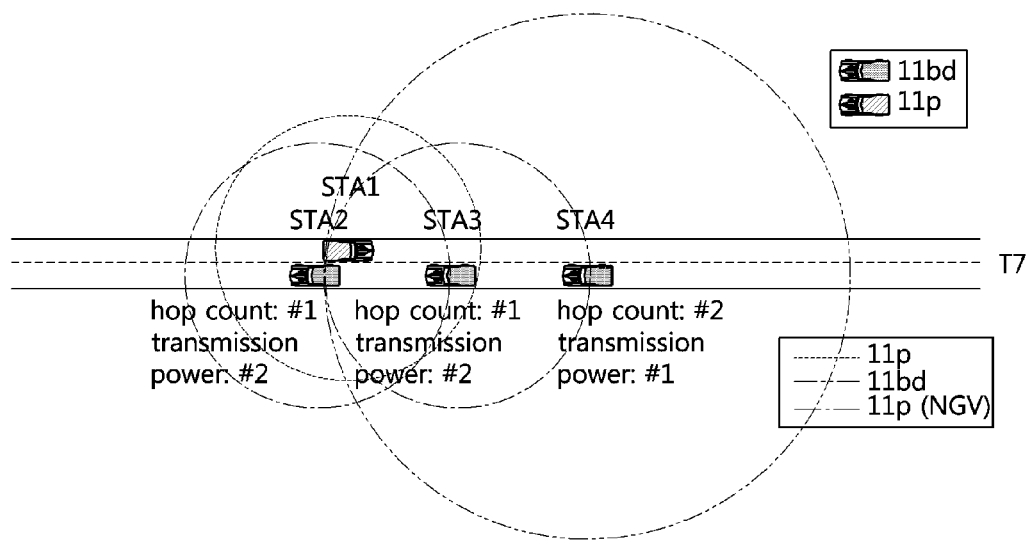
FIG. 8G is a diagram illustrating an operation of a new communication node transitioning an operating state according to a seventh exemplary embodiment of the present disclosure.

In FIG. 8G, the new communication node STA4 may receive a legacy frame (HOP: #1, Power: #2) from the STA3. Upon receiving the legacy frame from the STA3, the STA4 may transition to the S4 state and operate in the S4 state. The STA4 operating in the S4 state may transmit a legacy frame indicating (HOP: #2, Power: #1). The STA4 transitioned to the S4 state may start a T2 timer. If the STA3 for which the T2 timer is running does not receive a legacy frame, the STA3 may transition to the S1 state and operate in the S1 state.

Figure 8H:
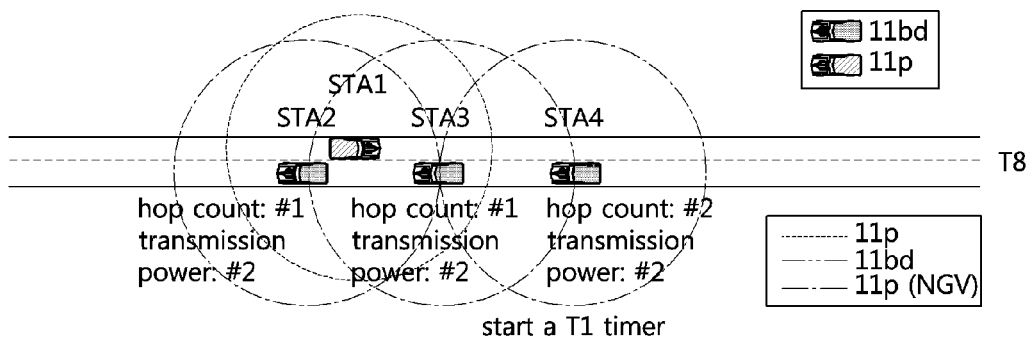
FIG. 8H is a diagram illustrating an operation of a new communication node transitioning an operating state according to an eighth exemplary embodiment of the present disclosure.

In FIG. 8H, the STA4 that has transitioned from the S1 state to the S4 state may transmit a legacy frame a preset number of times, and then transition to the S5 state and operate in the S5 state. The STA4 operating in the S5 state may set a T1 counter. In addition, the STA4 operating in the S5 state may transmit a legacy frame indicating (HOP: #2, Power: #2).

Figure 9A:
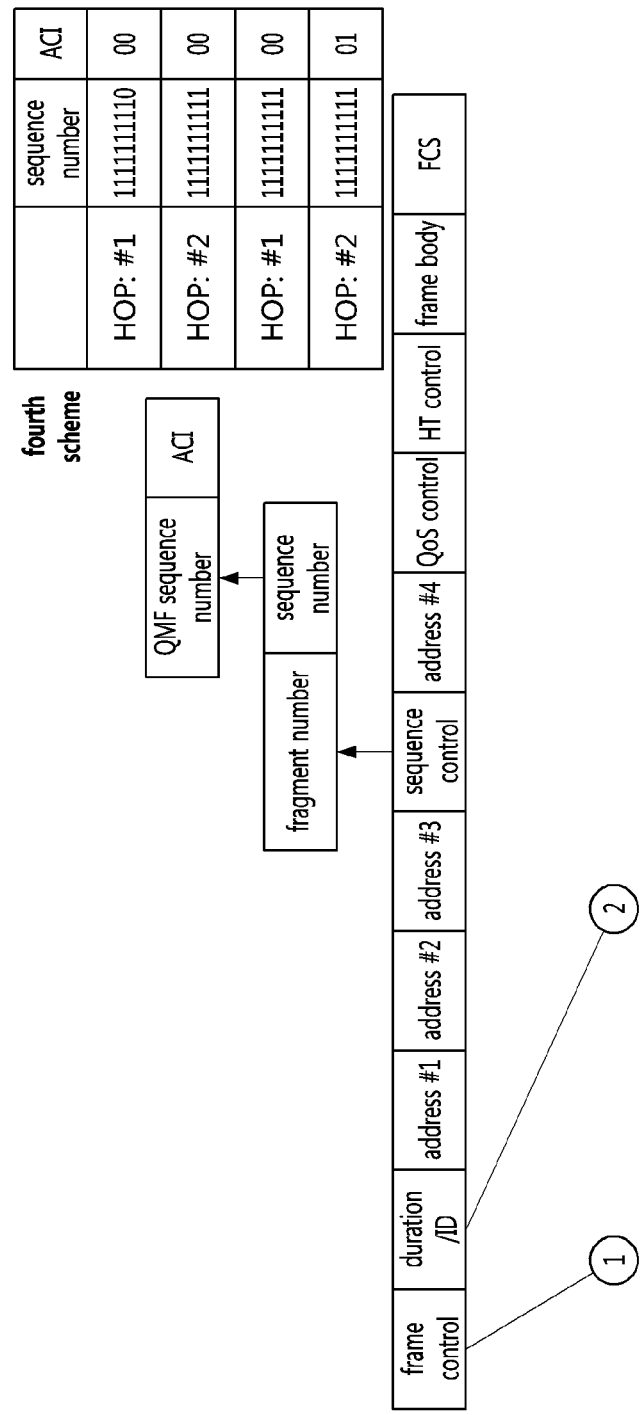
FIG. 9A is a diagram illustrating a second exemplary embodiment of a configuration of a legacy frame generated by a new communication node.
Figure 9B:
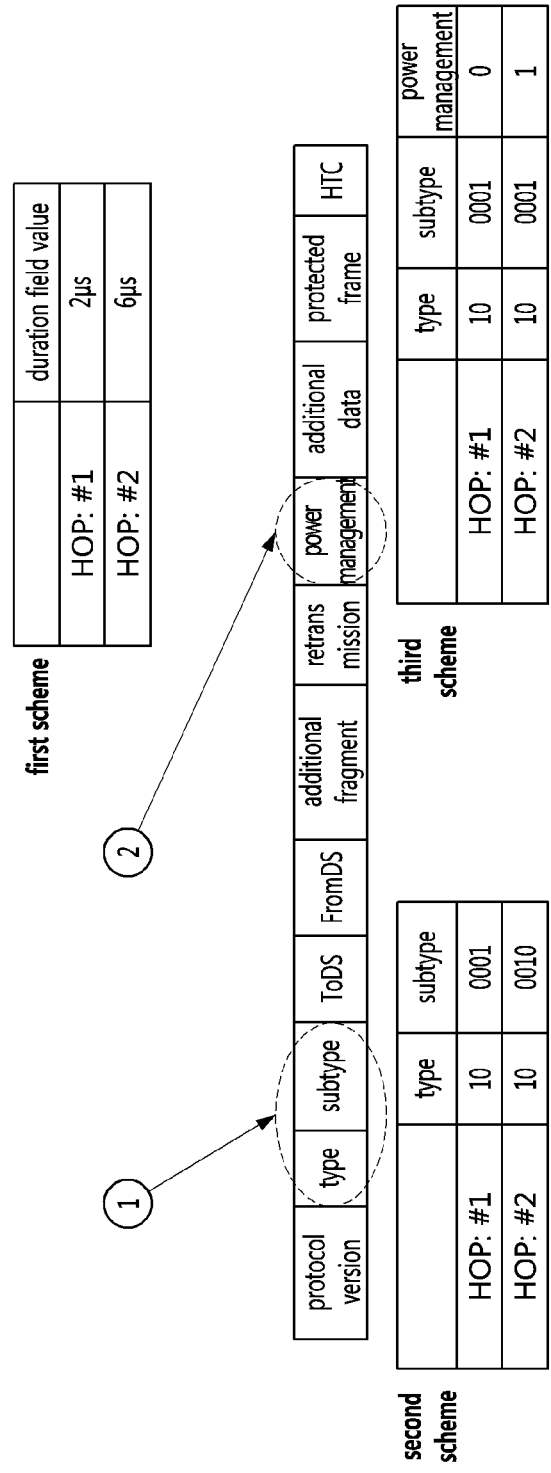
FIG. 9B is a diagram illustrating a second exemplary embodiment of a configuration of a legacy frame generated by a new communication node.

FIGS. 9A and 9B are diagrams illustrating a second exemplary embodiment of a configuration of a legacy frame generated by a new communication node.

As shown in FIGS. 9A and 9B, a frame transmitted and received by communication nodes (legacy communication nodes and new communication nodes) may include a frame control field, a duration/ID field, at least one receiver address field, a sequence control field, and a QoS control field, and a HT control field.

A legacy frame generated by a new communication node may further include a hop count value, thereby being distinguished from a legacy frame transmitted by a legacy communication node. The frame of FIGS. 9A and 9B may indicate a hop count as #1 or #2. In order to indicate that the frame is a legacy frame transmitted by a new communication node, the new communication node may configure previously unused indicators in a MAC header of the legacy frame.

According to an exemplary embodiment of the present disclosure, the new communication node may indicate a hop count by setting the duration value of the MAC header to a value different from that of the legacy standard. According to the legacy standard, one OFDM symbol time of a 10 MHz channel according to the IEEE 802.11p may be 8 μs. Therefore, the communication node may set the duration value to a value less than 8 μs to indicate the hop count of the frame. For example, the communication node may indicate (HOP: #1) by setting the duration value to 2. The communication node may indicate (HOP: #2) by setting the duration value to 6.

According to another exemplary embodiment of the present disclosure, the new communication node may set the value of the frame control field of the MAC header to a combination of a type and a subtype, which is different from that of the legacy standard. Specifically, the communication node may set the hop count of the frame by setting 6 bits including a 2-bit type field and a 4-bit subtype field included in the frame control field. For example, the communication node may indicate (HOP: #1) by setting the values of the type field and the subtype field to '100001'. The communication node may indicate (HOP: #2) by setting the values of the type field and the subtype field to '100010'.

According to another embodiment of the present disclosure, the new communication node may set the value of the frame control field of the MAC header to a combination of a type and a subtype different from the legacy standard. Specifically, the communication node may set the hop count of the frame through a combination of a 2-bit type field, a 4-bit subtype field, and a 1-bit power management field value included in the frame control field. For example, the communication node may indicate (HOP: #1) by setting the values of the type field and the subtype field to '1000010'. In addition, the communication node may indicate (HOP: #2) by setting the values of the type field and the subtype field to '1000011'.

According to another exemplary embodiment of the present disclosure, the new communication node may set the value of the sequence number field to one of preset values. The communication node may indicate a hop count of the frame by setting the sequence number and an ACI of the sequence number field to preset values. For example, the communication node may indicate (HOP: #1) by setting the sequence number to '111111110' and the ACI field to '00'. In addition, the communication node may indicate (HOP: #2) by setting the sequence number to '1111111111' and the ACI field to '00'. Alternatively, the communication node may indicate (HOP: #1) by setting the sequence number to '1111111111' and the ACI field to '00'. In addition, the communication node may indicate (HOP: #2) by setting the sequence number to '1111111111' and the ACI field to '01'.

Figure 10:
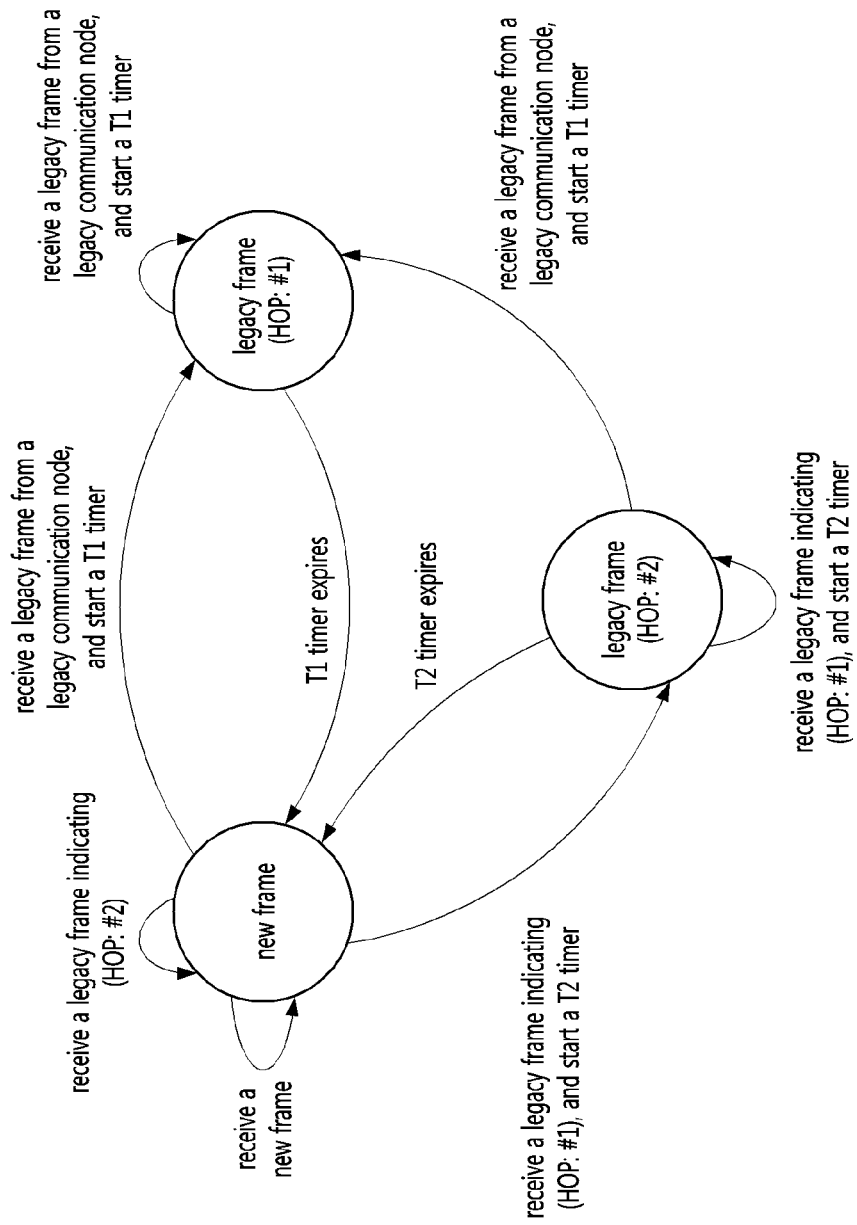
FIG. 10 is a diagram illustrating a second exemplary embodiment of operating states and transitions therebetween of a new communication node transmitting a legacy frame.

FIG. 10 is a diagram illustrating a second exemplary embodiment of operating states and transitions therebetween of a new communication node transmitting a legacy frame.

As shown in FIG. 10, the new communication node may operate in one of three operating states S1, S2, and S3. A frame transmission scheme of the new communication node may vary depending on the operating state of the new communication node. Table 4 below is a description of each operating state.

TABLE 4

| State | Transmission frame format | Description |
|---|---|---|
| S1 | New (IEEE 802.11bd) | State capable of transmitting a new frame |
| S2 | Legacy (Hop: #1) | State in which a legacy frame indicating (HOP: #1) is transmitted. A T1 timer starts when this state begins. |
| S3 | Legacy (Hop: #2) | State in which a legacy frame indicating (HOP: #2) is transmitted. A T2 timer starts when this state begins. |

The new communication node may transmit and receive a new frame to and from other new communication nodes. The new communication node transmitting and receiving a new frame may operate in the S1 state. In addition, when a new frame (e.g., frame according to the standard defined in the IEEE 802.11bd) is received from another new communication node, the new communication node may operate continuously in the S1 state.

The new communication node may receive a legacy frame according to the conventional standard from a legacy communication node. The communication node receiving the legacy frame may transition to the S2 state. The communication node operating in the S2 state may start a T1 timer. While the T1 timer running, the communication node operating in the S2 state may add an indicator indicating (HOP: #1) in a legacy frame.

The new communication node operating in the S2 state may receive a legacy frame from a legacy communication node before the T1 timer expires. The new communication node receiving the legacy frame may maintain the S2 state. The new communication node receiving the legacy frame may restart the T1 timer. The new communication node in the S2 state that has not received a legacy frame from a legacy communication node before the T1 timer expires may transition to the S1 state.

When a new frame is received in the S1 state or a legacy frame indicating (HOP: #2) is received, the new communication node may maintain the S1 state. When the legacy frame indicating (HOP: #1) is received, the new communication node operating in the S1 state may transition to the S3 state. The communication node operating in the S3 state may start a T2 timer. While the T2 timer is running, the communication node operating in the S3 state may add an indicator indicating (HOP: #2) to a legacy frame.

The new communication node operating in the S3 state may receive a legacy frame from a legacy communication node before the T2 timer expires. The new communication node receiving the legacy frame may transition to the S2 state. Upon receiving the legacy frame, the new communication node may end the operation of the T2 timer and start a T1 timer.

The new communication node operating in the S3 state may receive a legacy frame indicating (HOP: #1) before the T2 timer expires. The new communication node receiving the legacy frame indicating (HOP: #1) may maintain the S3 state. The new communication node receiving the legacy frame may restart the T2 timer. The new communication node in the S3 state that has not received a legacy frame before the T2 timer expires may transition to the S1 state.

Figure 11A:
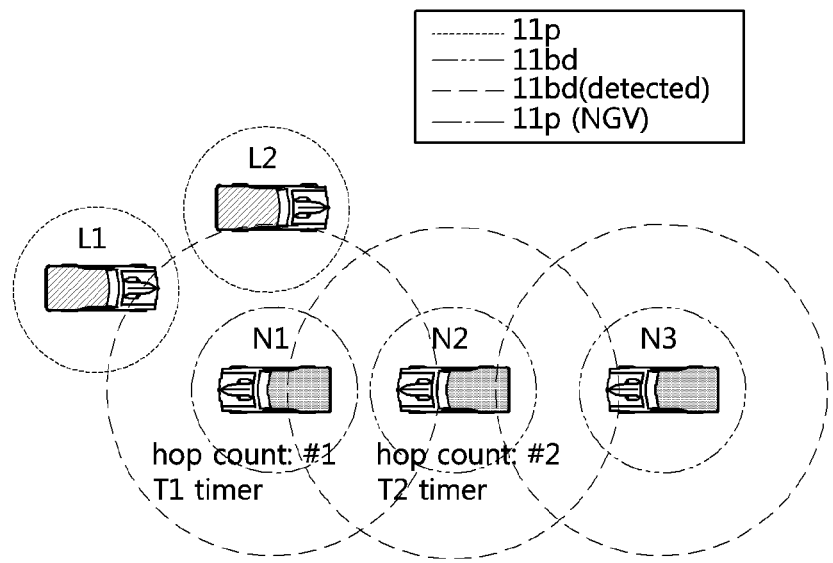
FIG. 11A is a diagram illustrating a first operation of a new communication node for transitioning an operating state according to a second exemplary embodiment of the present disclosure.
Figure 11B:
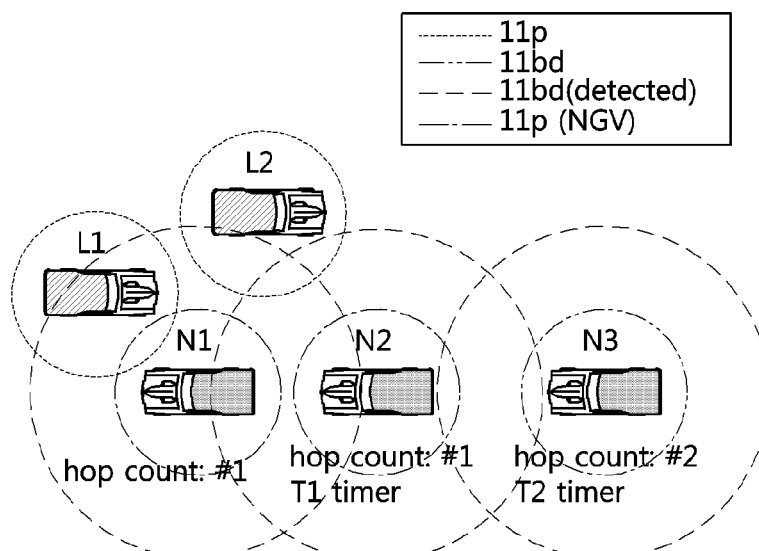
FIG. 11B is a diagram illustrating a first operation of a new communication node for transitioning an operating state according to a second exemplary embodiment of the present disclosure.

FIGS. 11A to 11B are diagrams illustrating an operation of a new communication node for transitioning an operating state according to a second exemplary embodiment of the present disclosure.

As shown in FIGS. 11A to 11B, a mutual coexistence communication system may be a communication system in which new communication nodes (i.e., IEEE 802.11bd STAs) and legacy communication nodes (i.e., IEEE 802.11p STAs) coexist. The new communication node 11bd may transmit and receive a frame using a new frame format and transmission scheme, and the legacy communication node 11p may transmit and receive a frame using a legacy frame format and transmission scheme. The transmission/reception operation and range of the new frame may be shown as a circle denoted by a line indicated by '11bd', and the transmission/reception operation and range of the legacy frame may be shown as a circle denoted by a line indicated by '11p'. In addition, '11p (NGV)' may show the transmission/reception operation and range of the legacy frame generated by the new communication nodes, and as described above, the legacy frame may further include information on a hop count and a transmission power.

TABLE 5

| Line | Communication node | Description |
|---|---|---|
| 11p | Legacy communication node | Reception range of a legacy communication node, which may be the same as a transmission range of the legacy communication node |
| 11bd | New communication node | Range in which a legacy communication can detect a frame of a new communication node. The legacy communication code cannot decode a new frame, but can detect a channel occupancy state. |
| 11bd (detected) | New communication node | Reception range of a new communication node. The new communication node can receive both a legacy frame and a new frame. |
| 11p (NGV) | New communication node | Range in which a legacy communication node can detect a frame of a new communication node |

In FIG. 11A, new communication nodes N2 to N3 may be located outside a communication coverage of a legacy communication node L1. Accordingly, the new communication nodes may not receive a legacy frame, and may operate in the S1 state of FIG. 10.

In FIG. 11A, among the new communication nodes, the communication node N1 may receive a legacy frame of legacy communication nodes L1 and L2 located in a sensing range. Upon receiving the legacy frame, the communication node N1 may recognize the legacy communication nodes L1 and L2. Therefore, the communication node N1 may configure a frame to enable communication with the legacy communication nodes.

Upon receiving the legacy frame, the communication node N1 may operate in the S2 state of FIG. 10. The communication node N1 operating in the S2 state may start a T1 timer. The communication node N1 operating in the S2 state may transmit a frame according to the legacy frame standard, which includes an indicator indicating a hop count. That is, an indicator indicating (HOP: #1) may be added to the legacy frame and transmitted. The method of indicating a hop count through the legacy frame may be one of first to fourth schemes shown in FIGS. 9A and 9B. Since a legacy communication node that has received the frame of the communication node N1 cannot interpret the indicator, the legacy communication node may recognize the received frame as a legacy frame, and the new communication node may recognize a hop count and a transmission power of the frame.

The new communication node N2 may receive a legacy frame indicating (HOP: #1) from the communication node N1. The communication node receiving the legacy frame from the communication node N1 may operate in the S3 state of FIG. 10. The communication node N2 operating in the S3 state may start a T2 timer. The communication node N2 operating in the S3 state may transmit a legacy frame by adding an indicator indicating (HOP: #2) to the legacy frame.

The new communication node N3 may receive the legacy frame indicating (HOP: #2) from the communication node N2. The communication node N3 receiving the legacy frame from the communication node N2 may operate in the S1 state of FIG. 10. That is, the communication node N3 may maintain the previous operating state.

In FIG. 11B, among the new communication nodes, the communication node N2 may receive a legacy frame of the legacy communication node L2 located in a sensing range. The communication node N2 receiving the legacy frame may recognize the legacy communication node L2. Therefore, the communication node N2 may configure a frame to enable communication with the legacy communication node.

The communication node N2 receiving the legacy frame may operate in the S2 state of FIG. 10. The communication node N2 operating in the S2 state may start a T1 timer. The communication node N2 operating in the S2 state may transmit a legacy frame by adding an indicator indicating (HOP: #1) to the legacy frame.

The new communication node N3 may receive the legacy frame indicating (HOP: #1) from the communication node N2. The communication node N3 receiving the legacy frame from the communication node N2 may operate in the S3 state of FIG. 10. The communication node N3 operating in the S3 state may start a T2 timer. The communication node N2 operating in S3 state may transmit the legacy frame by adding an indicator indicating (HOP: #2) to the legacy frame.

Figure 12A:
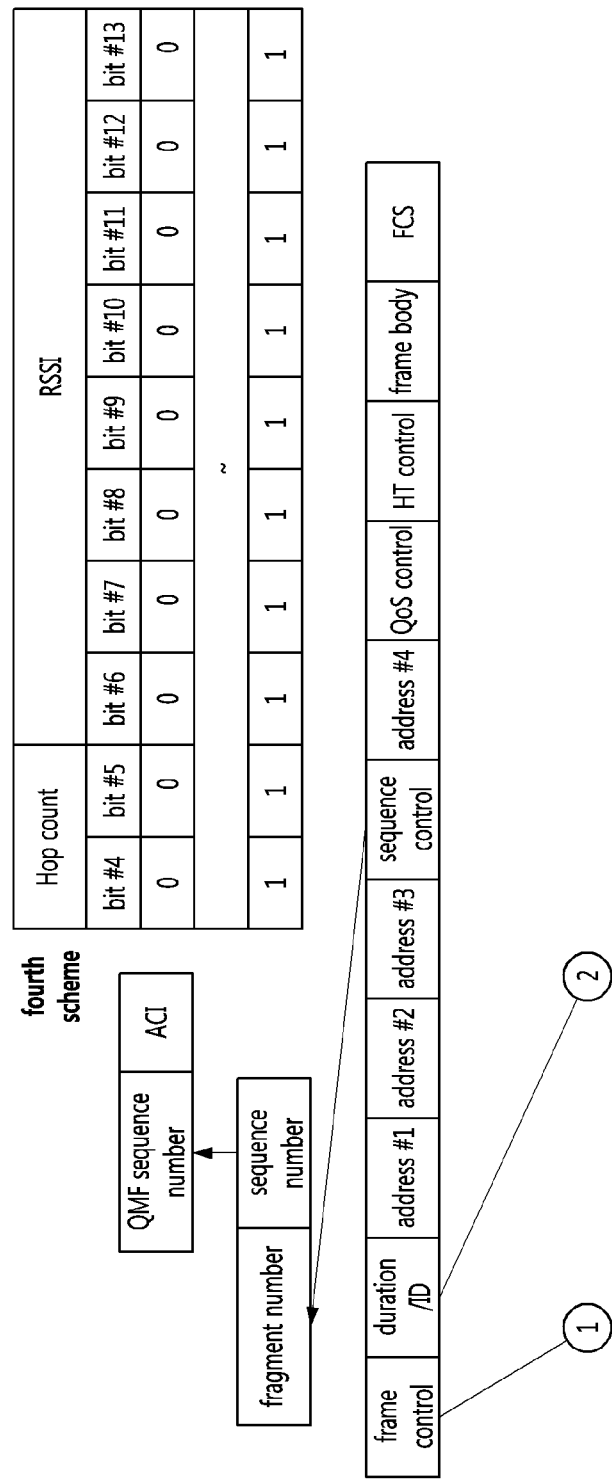
FIG. 12A is a diagram illustrating a third exemplary embodiment of a configuration of a legacy frame generated by a new communication node.
Figure 12B:
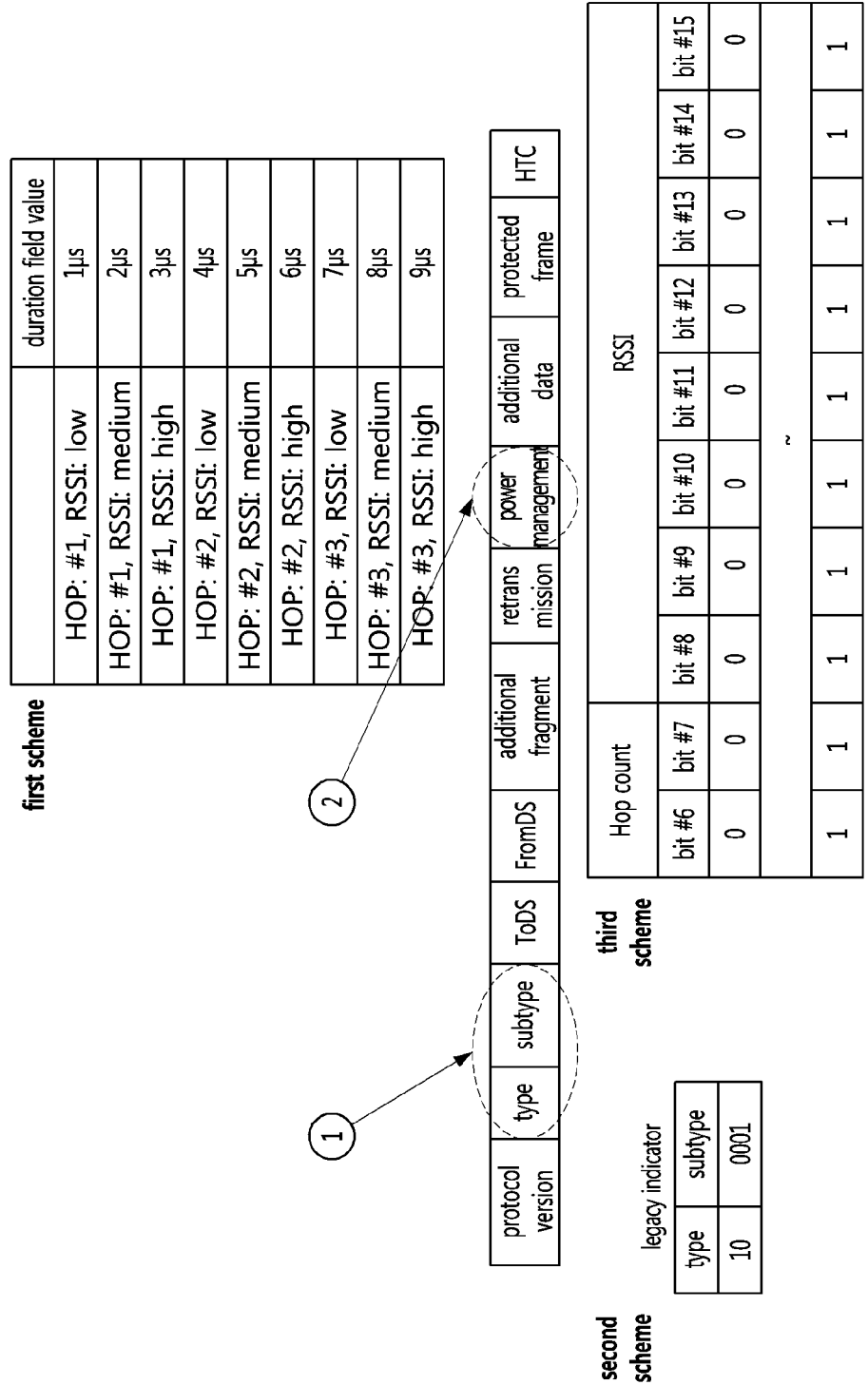
FIG. 12B is a diagram illustrating a third exemplary embodiment of a configuration of a legacy frame generated by a new communication node.

FIGS. 12A and 12B are diagrams illustrating a third exemplary embodiment of a configuration of a legacy frame generated by a new communication node.

As shown in FIGS. 12A and 12B, a frame transmitted and received by communication nodes (legacy communication nodes and new communication nodes) may include a frame control field, a duration/ID field, at least one receiver address field, a sequence control field, and a QoS control field, and a HT control field.

A legacy frame generated by a new communication node may further include a frame format indicator, a hop count value, and a received signal strength indicator (RSSI) value, thereby being distinguished from a legacy frame transmitted by a legacy communication node. The frame of FIGS. 12A and 12B may indicate a hop count as #1 or #2. In order to indicate that the frame is a legacy frame transmitted by a new communication node, the new communication node may configure previously unused indicators in a MAC header of the legacy frame.

According to an exemplary embodiment of the present disclosure, the new communication node may indicate that the frame is a legacy frame transmitted by a new communication node by setting the value of the frame control field of the MAC header to a combination of a type and a subtype, which is different from that of the existing standard. Specifically, the communication node may set a legacy frame indicator by setting 6 bits including a 2-bit type field and a 4-bit subtype field included in the frame control field. For example, the communication node may indicate that the frame is a legacy frame transmitted by a new communication node by setting the values of the type field and the subtype field to '101101'.

According to an exemplary embodiment of the present disclosure, the new communication node may set a hop count and an RSSI by setting the duration value of the MAC header to a value different from that of the legacy standard. The MAC header may indicate one of three hop counts and one of three RSSI values. The new communication node may indicate the hop count and the RSSI by setting the value of the duration field of the MAC header according to a table.

According to another embodiment of the present disclosure, the new communication node may set the value of the frame control field of the MAC header to a combination of a type and a subtype, which is different from that of the legacy standard. Specifically, the communication node may indicate a hop count of the frame through a combination of a 2-bit type field, a 4-bit subtype field, and a 1-bit power management field value included in the frame control field. For example, the communication node may indicate (HOP: #1) by setting the values of the type field and the subtype field to '1000010'. In addition, the communication node may indicate (HOP: #2) by setting the values of the type field and the subtype field to '1000011'.

According to another exemplary embodiment of the present disclosure, the new communication node may indicate a hop count and an RSSI of the frame by using some bits of the sequence number field. For example, the new communication node may indicate the hop count using the 4th to 5th bits of the sequence control field, and may indicate the RSSI using the 6th to 13th bits.

According to yet another exemplary embodiment of the present disclosure, the new communication node may indicate a hop count and an RSSI of the frame by using some bits of the QoS control field. For example, the new communication node may indicate the hop count using the 7th to 8th bits of the sequence control field, and may indicate the RSSI using the 10th to 15th bits.

Figure 13A:
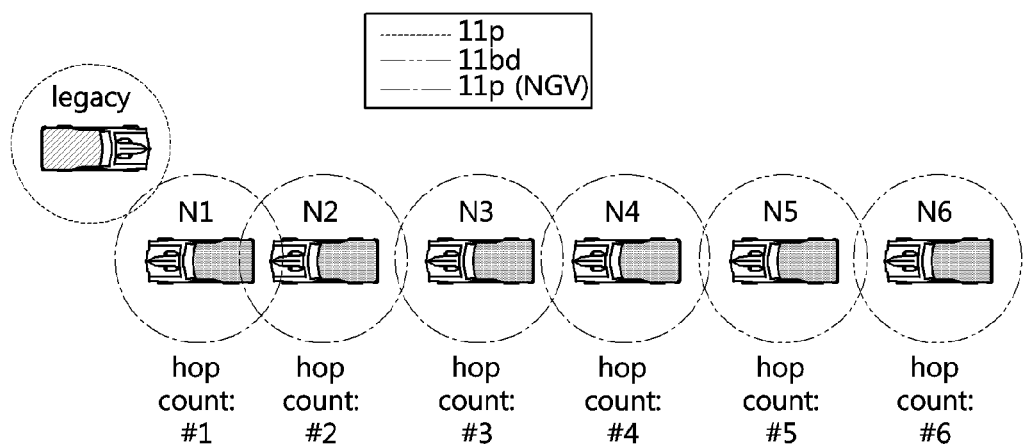
FIG. 13A is a diagram illustrating an exemplary embodiment of a first operation of a new communication node setting a hop count.
Figure 13B:
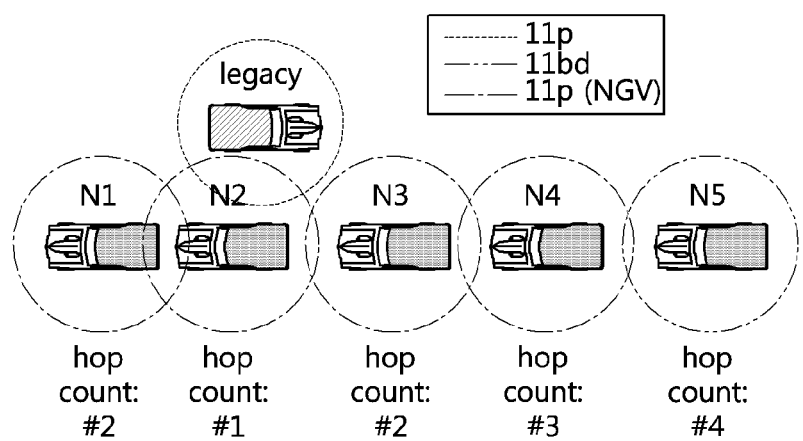
FIG. 13B is a diagram illustrating an exemplary embodiment of a second operation of a new communication node setting a hop count.

FIGS. 13A to 13B are diagrams illustrating an exemplary embodiment of an operation of a new communication node setting a hop count.

As shown in FIGS. 13A to 13B, a mutual coexistence communication system may be a communication system in which new communication nodes (i.e., IEEE 802.11bd STAs) and legacy communication nodes (i.e., IEEE 802.11p STAs) coexist. The new communication node 11bd may transmit and receive a frame using a new frame format and transmission scheme, and the legacy communication node 11p may transmit and receive a frame using a legacy frame format and transmission scheme. The transmission/reception operation and range of the new frame may be shown as a circle denoted by a line indicated by '11bd', and the transmission/reception operation and range of the legacy frame may be shown as a circle denoted by a line indicated by '11p'. In addition, '11p (NGV)' may show the transmission/reception operation and range of the legacy frame generated by the new communication nodes, and as described above, the legacy frame may further include information on a hop count and a transmission power.

In FIG. 13A, new communication nodes N2 to N6 may be located outside a communication coverage of a legacy communication node. Accordingly, the new communication nodes may not receive a legacy frame, and may operate in the S1 state of FIG. 10.

In FIG. 13A, among the new communication nodes, the communication node N1 may receive a legacy frame of a legacy communication node located in a sensing range. Upon receiving the legacy frame, the communication node N1 may recognize the legacy communication node. Therefore, the communication node N1 may configure a frame to enable communication with the legacy communication node.

Upon receiving the legacy frame, the communication node N1 may transmit a frame further including indicators indicating a hop count and an RSSI of the frame. That is, the communication node N1 may transmit a legacy frame by adding an indicator indicating (HOP: #1, RSSI) to the legacy frame. The method of indicating the hop count and RSSI through the legacy frame may be one of the first to third schemes shown in FIGS. 12A to 12B. Since a legacy communication node receiving the frame of the communication node N1 cannot interpret the indicator, the legacy communication node may recognize the received frame as a legacy frame, and new communication nodes (e.g., N2 to N6) may recognize the hop count and transmission power of the frame.

The new communication node N2 may receive the legacy frame indicating (HOP: #1) from the communication node N1. Upon receiving the legacy frame from the communication node N1, the communication node N2 may transmit a frame further including an indicator indicating a hop count and an RSSI of the frame. That is, the communication node N1 may transmit a legacy frame by adding an indicator indicating (HOP: #2) and RSSI to the legacy frame. The new communication nodes N3 to N6 may receive a legacy frame including an indicator indicating a hop count and RSSI from another new communication node, and may set a hop count based on what the received legacy frame indicates. The new communication nodes may transmit a frame including the set hop count and RSSI indicator to other communication nodes.

In FIG. 13B, a legacy communication node located within the communication coverage of the communication node N1 may move to the communication coverage of the communication node N2. Among the new communication nodes, the communication node N2 may receive a legacy frame of the legacy communication node located in a sensing range. Upon receiving the legacy frame, the communication node N2 may reset the hop count. That is, the communication node N2 may transmit a legacy frame by adding an indicator indicating (HOP: #1) and RSSI to the legacy frame.

The new communication node N1 (or N3) may receive the legacy frame indicating (HOP: #1) from the communication node N2. Upon receiving the legacy frame from the communication node N2, the communication node N1 (or N3) may transmit a frame further including an indicator indicating a hop count and RSSI of the frame. That is, the communication node N1 (or N3) may transmit a legacy frame by adding an indicator indicating (HOP: #2) and RSSI to the legacy frame. The new communication nodes N4 to N5 may receive a legacy frame including an indicator indicating a hop count and RSSI from another new communication node, and may set a hop count based on what the received legacy frame indicates. The new communication nodes may transmit a frame including the set hop count and RSSI indicator to other communication nodes.

The communication nodes of FIGS. 13A and 13B may generate a frame including information on a hop count and an RSSI according to a method described below.

Figure 14:
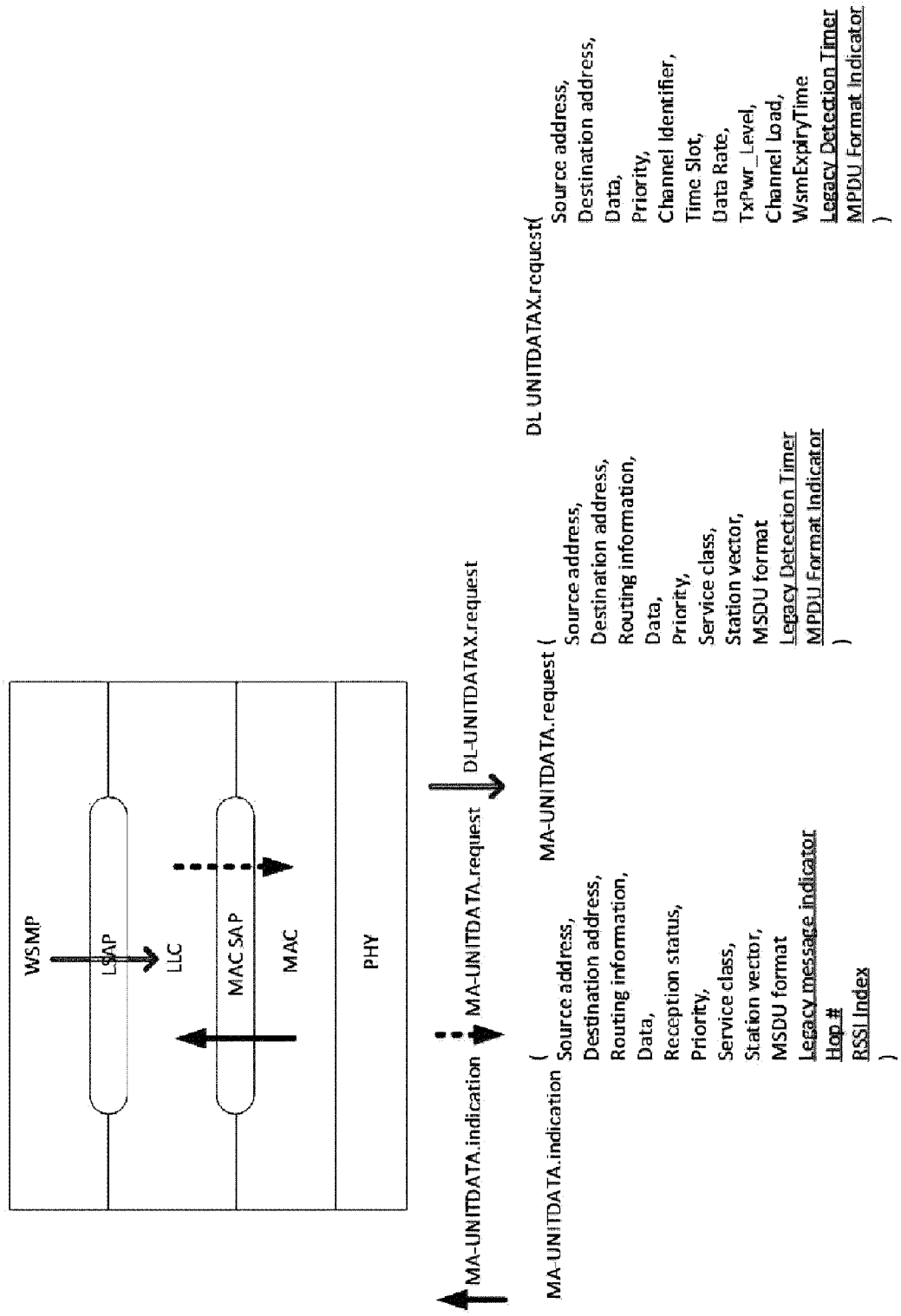
FIG. 14 is a diagram illustrating an exemplary embodiment of an inter-layer operation for exchanging information received through a frame.

FIG. 14 is a diagram illustrating an exemplary embodiment of an inter-layer operation for exchanging information received through a frame.

A new communication node may receive a legacy frame from a legacy communication node. When the received legacy frame does not include information on a new communication node, the new communication node may recognize that the received frame is a legacy frame. The new communication node may transmit information of the received frame to an upper layer. For example, the new communication node may transmit information on a hop count of the frame and an RSSI of the frame to the upper layer (e.g., WAVE short message protocol (WSMP) layer, etc.). The communication node receiving the legacy frame may set the hop count to 1.

The WSMP layer may obtain the hop count and RSSI of the legacy frame received from a MAC layer. The WSMP layer may determine a MPDU format based on the obtained information on the hop count and RSSI. For example, when the hop count of the legacy frame exceeds a preset range or the RSSI falls within a preset range, the WSMP layer may determine a format of a frame to be transmitted by the new communication node as a new frame. In addition, when the hop count of the legacy frame falls within the preset range or the RSSI exceeds the preset range, the WSMP layer may determine a format of a frame to be transmitted by the new communication node as a legacy frame.

The WSMP layer may deliver an indicator including information on the determined MPDU format and information on a legacy frame detection timer to an LLC sublayer, which is a lower layer. The LLC sublayer may deliver an indicator including the information on the MPDU format and the legacy frame detection timer obtained from the WSMP layer to the MAC layer, which is a lower layer. The MAC layer may generate a MPDU frame based on the received information on the MPDU format and the legacy frame detection timer. The new communication node may transmit the frame generated by the MAC layer to other communication nodes. In addition, the new communication node may detect a legacy frame from other communication nodes until a timer expires, which is set based on the obtained information on the legacy frame detection timer.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a wireless communication network, the operation method comprising:
   receiving a first frame according to a first communication protocol from a second communication node;
   determining whether hop count information is included in the first frame;
   in response to determining that the hop count information is not included in the first frame, generating and transmitting a second frame according to the first communication protocol, the second frame including hop count information set to an initial value;
   configuring an operating state of the first communication node to a first state in which the first communication node operates according to the first communication protocol; and
   when a frame according to the first communication protocol is not received from other communication nodes for a preset time period after transmitting the second frame, configuring the operating state of the first communication node to a second state of operating according to a second communication protocol.

2. The operation method according to claim 1, wherein the second communication node is an IEEE 802.11p legacy communication node, and the first communication protocol is IEEE 802.11p.

3. The operation method according to claim 1, further comprising, when frames according to the first communication protocol are transmitted with a first transmission power a preset number of times in the first state, setting a transmission power of the first communication node to a second transmission power different from the first transmission power.

4. The operation method according to claim 3, further comprising, when a frame according to the first communication protocol is not received from other communication nodes for a preset time period after the transmission power of the first communication node is set to the second transmission power, setting the transmission power of the first communication node to the first transmission power.

5. The operation method according to claim 3, further comprising, when a frame according to the first communication protocol is received from other communication nodes within a preset time period after the transmission power of the first communication node is set to the second transmission power, maintaining the transmission power of the first communication node set to the second transmission power additionally for the preset time period.

6. The operation method according to claim 1, wherein the second frame indicates the hop count information through at least one of a frame control field, a duration field, and a sequence control field of the second frame.

7. An operation method of a first communication node in a wireless communication network, the operation method comprising:
   receiving a first frame according to a first communication protocol from a second communication node;
   identifying information on a hop count included in the first frame;
   in response to determining that the hop count is within a preset value, increasing the hop count, generating and transmitting a second frame according to the first communication protocol including information on the increased hop count, and configuring an operating state of the first communication node to a first state in which the first communication node operates according to the first communication protocol; and
   in response to determining that the hop count exceeds the preset value, configuring the operating state of the first communication node to a second state in which the first communication node operates according to a second communication protocol.

8. The operation method according to claim 7, wherein the information on the hop count is information on a hop count between the second communication node and a legacy communication node.

9. The operation method according to claim 7, further comprising, when no frames are received from other communication nodes for a preset time period after transmitting the second frame, configuring the operating state of the first communication node to the second state.

10. The operation method according to claim 7, further comprising, when frames according to the first communication protocol are transmitted with a first transmission power a preset number of times in the first state, setting a transmission power of the first communication node to a second transmission power different from the first transmission power.

11. The operation method according to claim 10, further comprising, when a frame according to the first communication protocol is not received from other communication nodes for a preset time period after the transmission power of the first communication node is set to the second transmission power, setting the transmission power of the first communication node to the first transmission power.

12. The operation method according to claim 10, further comprising, when a frame according to the first communication protocol is received from other communication nodes within a preset time period after the transmission power of the first communication node is set to the second transmission power, maintaining the transmission power of the first communication node to the second transmission power additionally for the preset time period,
   wherein a hop count of the frame according to the first communication protocol is identical to the hop count of the first frame.

13. The operation method according to claim 7, further comprising, when a frame according to the first communication protocol transmitted from other communication nodes with a second transmission power lower than a transmission power of the first frame is received in the first state, setting a transmission power of the first communication node to the second transmission power.

14. The operation method according to claim 7, wherein the second frame indicates hop count information of the second frame through at least one of a frame control field, a duration field, and a sequence control field of the second frame.

15. The operation method according to claim 13, wherein the second frame further indicates information on a transmission power of the second frame through at least one of a frame control field, a duration field and a sequence control field of the second frame.

16. An operation method of a first communication node in a wireless communication network, the operation method comprising:
   receiving a first frame according to a first communication protocol from a second communication node;
   identifying a hop count included in the first frame, the hop count indicating a hop count between the second communication node and a legacy communication node; and
   in response to determining that the hop count is equal to or less than a preset value, generating and transmitting a second frame according to the first communication protocol, and configuring an operating state of the first communication node to a first state in which the first communication node operates according to the first communication protocol.

17. The operation method according to claim 16, wherein the first frame further includes information of a received signal strength intensity (RSSI) of a frame transmitted from the legacy communication node at the second communication node.

18. The operation method according to claim 17, further comprising, in response to determining that the hop count is less than or equal to the preset value and the RSSI is less than a preset value, configuring the operating state of the first communication node to a second state of operating according to a second communication protocol.

19. The operation method according to claim 17, wherein the second frame indicates information on the hop count of the second frame and an RSSI of the first frame at the first communication node through at least one of a frame control field, a duration field, and a sequence control field of the second frame of the second frame.

* * * * *